US009769131B1

(12) United States Patent
Hartley et al.

(10) Patent No.: US 9,769,131 B1
(45) Date of Patent: Sep. 19, 2017

(54) FAST RECONFIGURING ENVIRONMENT FOR MOBILE COMPUTING DEVICES

(71) Applicant: Architecture Technology Corporation, Minneapolis, MN (US)

(72) Inventors: Timothy Hartley, Eden Prairie, MN (US); Ranga Ramanujan, Medina, MN (US); Jafar Al-Gharaibeh, Minneapolis, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 15/226,515

(22) Filed: Aug. 2, 2016

(51) Int. Cl.
*H04L 29/06* (2006.01)
*H04L 29/08* (2006.01)
*G06F 21/74* (2013.01)

(52) U.S. Cl.
CPC ........ *H04L 63/0428* (2013.01); *H04L 63/105* (2013.01); *H04L 67/34* (2013.01); *G06F 21/74* (2013.01)

(58) Field of Classification Search
None
See application file for complete search history.

(56) References Cited

U.S. PATENT DOCUMENTS

| | | | | |
|---|---|---|---|---|
| 2002/0023210 A1* | 2/2002 | Tuomenoksa | ...... | H04L 12/2602 713/161 |
| 2002/0052915 A1* | 5/2002 | Amin-Salehi | ...... | H04Q 11/0407 709/203 |
| 2002/0065083 A1* | 5/2002 | Patel | ...... | H04W 48/10 455/452.1 |
| 2002/0087724 A1* | 7/2002 | Datta | ...... | H04L 12/5692 709/241 |
| 2005/0055588 A1* | 3/2005 | Nalawadi | ...... | G06F 9/44594 713/300 |

(Continued)

OTHER PUBLICATIONS

"Fast Reconfiguring Environment for Electronic Kneedboard (Freeboard)", Navy SBIR FY2015.2, retrieved on Mar. 16, 2016, from http://www.navysbir.com/15_2/70.htm, 1 pp.

(Continued)

*Primary Examiner* — Malcolm Cribbs
(74) *Attorney, Agent, or Firm* — Shumaker & Sieffert, P.A.

(57) ABSTRACT

An example method includes receiving an indication of a selection of a first application environment that includes a first virtual environment associated with a first security domain and is configured to isolate execution of software applications within the first application environment, suspending execution of a second application environment that includes a second virtual environment associated with a second security domain different from the first security domain, initiating execution of the first application environment, identifying information associated with the first security domain and provided by the first application environment that is to be sent to an external computing device associated with the first security domain, selecting communication network(s) from one or more communication networks that are each available to the mobile computing device for data communication, encrypting, based on the first security domain and network(s), the information, and sending, to the external computing device via the network(s), the encrypted information.

28 Claims, 9 Drawing Sheets

(56) References Cited

U.S. PATENT DOCUMENTS

| | | | |
|---|---|---|---|
| 2007/0255822 A1* | 11/2007 | Thiel | H04L 41/0668 709/224 |
| 2012/0016978 A1* | 1/2012 | Bosworth | G06F 9/5055 709/224 |
| 2013/0042295 A1* | 2/2013 | Kelly | G06F 21/53 726/1 |
| 2013/0290564 A1* | 10/2013 | Behle | H04L 61/60 709/245 |
| 2014/0137196 A1* | 5/2014 | Gomez Hernandez | G06F 21/53 726/3 |
| 2015/0006795 A1* | 1/2015 | Becker | G06F 12/1475 711/103 |
| 2015/0074745 A1* | 3/2015 | Stern | H04L 63/20 726/1 |
| 2015/0089213 A1* | 3/2015 | Isozaki | G06F 21/74 713/155 |
| 2015/0193239 A1* | 7/2015 | Dolph | G06F 1/3212 713/100 |

OTHER PUBLICATIONS

"Dual-Android on Nexus 10—Samsung Research UK Presentation for Xen Developer Summit", Samsung Electronics, Oct. 21, 2013, 11 pp.

"Samsung Demoing two Android VMs running on top of Xen on a Nexus 10 with PV GPU", Retrieved on Apr. 6, 2016 from http://www.xenproject.org/component/allvideoshare/video/samsung-nexus10-dual-xen-androud.html, 2 pp.

"Xen Project Beginners Guide", Retrieved from http://wiki.xenproject.org/wiki/Xen_Projec_Beginners_Guide, Dec. 5, 2015, 13 pp.

* cited by examiner

FAST RECONFIGURING ENVIRONMENT FOR MOBILE COMPUTING DEVICES

STATEMENT REGARDING FEDERALLY SPONSORED RESEARCH OR DEVELOPMENT

This invention was made with Government support under N68335-15-C-0374 awarded by the Department of the Navy. The Government has certain rights in this invention.

BACKGROUND

Today, users increasingly rely on computing devices, such as mobile computing devices, for voice communication, information access, and application usage. However, untrustworthy applications and certain online behaviors can potentially compromise the security of such computing devices. The continuing adoption of mobile computing devices in various organizations has created a growing desire for technologies that enable device users to separate their data into different categories use, such as, for example, classified and unclassified data.

SUMMARY

In one example, a method includes receiving, by a mobile computing device that includes one or more processors, an indication of a selection of a first application environment from a plurality of application environments, wherein the first application environment includes a first virtual environment that is associated with a first security domain, and wherein the first application environment is not currently executing on the mobile computing device. The example method further includes, responsive to receiving the indication of the selection of the first application environment, suspending, by the mobile computing device, execution of a second application environment from the plurality of application environments, wherein the second application environment is different from the first application environment, and wherein the second application environment includes a second virtual environment that is associated with a second security domain different from the first security domain. After suspending execution of the second application environment, the example method further includes initiating, by the mobile computing device, execution of the first application environment on the mobile computing device, wherein the first application environment is configured to isolate execution of one or more software applications within the first application environment, and identifying, by the mobile computing device, information associated with the first security domain and provided by the first application environment that is to be sent to an external computing device associated with the first security domain. The example method further includes selecting, by the mobile computing device, at least one communication network from one or more communication networks that are each available to the mobile computing device for data communication, wherein selecting the at least one communication network is based on one or more criteria associated with at least one of the information associated with the first security domain or the one or more communication networks. The example method further includes encrypting, by the mobile computing device, based on the first security domain and the at least one selected communication network, the information to generate encrypted information associated with the first security domain, and sending, by the mobile computing device and to the external computing device, via the at least one selected communication network, the encrypted information.

In one example, a mobile computing device includes one or more processors and a computer-readable storage device communicatively coupled to the one or more processors. The computer-readable storage device stores instructions that, when executed by the one or more processors, cause the one or more processors to: receive an indication of a selection of a first application environment from a plurality of application environments, wherein the first application environment comprises a first virtual environment that is associated with a first security domain, and wherein the first application environment is not currently executing on the mobile computing device; responsive to receiving the indication of the selection of the first application environment, suspend execution of a second application environment from the plurality of application environments, wherein the second application environment is different from the first application environment, and wherein the second application environment comprises a second virtual environment that is associated with a second security domain different from the first security domain; after suspending execution of the second application environment, initiate execution of the first application environment on the mobile computing device, wherein the first application environment is configured to isolate execution of one or more software applications within the first application environment; identify information associated with the first security domain and provided by the first application environment that is to be sent to an external computing device associated with the first security domain; select at least one communication network from one or more communication networks that are each available to the mobile computing device for data communication, wherein selecting the at least one communication network is based on one or more criteria associated with at least one of the information associated with the first security domain or the one or more communication networks; encrypt, based on the first security domain and the at least one selected communication network, the information to generate encrypted information associated with the first security domain; and send, to the external computing device, via the at least one selected communication network, the encrypted information.

In one example, a computer-readable storage device stores instructions that, when executed, cause a mobile computing device having one or more processors to perform operations. The operations include receiving an indication of a selection of a first application environment from a plurality of application environments, wherein the first application environment comprises a first virtual environment that is associated with a first security domain, and wherein the first application environment is not currently executing on the mobile computing device, and, responsive to receiving the indication of the selection of the first application environment, suspending execution of a second application environment from the plurality of application environments, wherein the second application environment is different from the first application environment, and wherein the second application environment comprises a second virtual environment that is associated with a second security domain different from the first security domain. The operations further include, after suspending execution of the second application environment, initiating execution of the first application environment on the mobile computing device, wherein the first application environment is configured to isolate execution of one or more software applications within the first application environment. The operations further include identifying information associated with the first security domain and provided by the first application environment that is to be sent to an external computing device associated with the first security domain, and selecting at least one communication network from one or more communication networks that are each available to the mobile computing device for data communication, wherein selecting the at least one communication network is based on one or more criteria associated with at least one of the information associated with the first security domain or the one or more communication networks. The operations further include encrypting, based on the first security domain and the at least one selected communication network, the information to generate encrypted information associated with the first security domain, and sending, to the external computing device, via the at least one selected communication network, the encrypted information.

The details of one or more examples are set forth in the accompanying drawings and the description below. Other features, objects, and advantages of the disclosure will be apparent from the description and drawings, and from the claims.

DETAILED DESCRIPTION

As noted above, untrustworthy applications and certain online behaviors can potentially compromise the security of computing devices. To be secure and useful, a computing device may, in many cases, provide multi-level security and accessibility to services. Current mobile device management solutions may not meet the needs of existing systems. The techniques of the present disclosure describe software-based systems that may enable multi-level access and/or security across different domains (e.g., classified and unclassified domains), protecting data from accidental or intentional leakage between security domains. These computing systems may be implemented on various types of mobile computing devices, such as smartphones and tablet computers.

In various examples described herein, a mobile computing device may provide independent application environments, or personas, for different security domains. As described herein, the multiple, independent application environments of the mobile computing device may enable potentially fast transition between personas, efficient allocation and reallocation of memory and persistent storage according to need and priority, and/or secure management of communication media and device communication according to application and end-point criteria, such as to minimize latency, maximize bandwidth, and, in various cases, prioritize traffic according to data type. As a result, the mobile computing device described herein may be configured to intelligently allocate processor usage, memory, and storage to an active (e.g., high priority) persona, while transparently suspending a background (e.g., low priority) persona to free resources and preserve rapid access. In addition, the mobile computing device may intelligently select from among available off-device communication paths in an effort to prioritize data, maximize bandwidth, optimize latency, protect data security, and abstract changes to connectivity.

Thus, the techniques of the present disclosure may, in various examples, implement a high-assurance virtualization environment that hosts multiple isolated personas and abstracts hardware and communication access. These techniques may further oversee the switching of personas, controlling the allocation and reallocation of resources to personas, as well as the sanitization of memory and persistent storage prior to reallocation. A communication manager executing on the mobile computing device may perform intelligent analysis of data packets and available communication media, including characterizing the available bandwidth and latency and differing endpoint connectivity, to optimize media use and application responsiveness.

Figure 1:
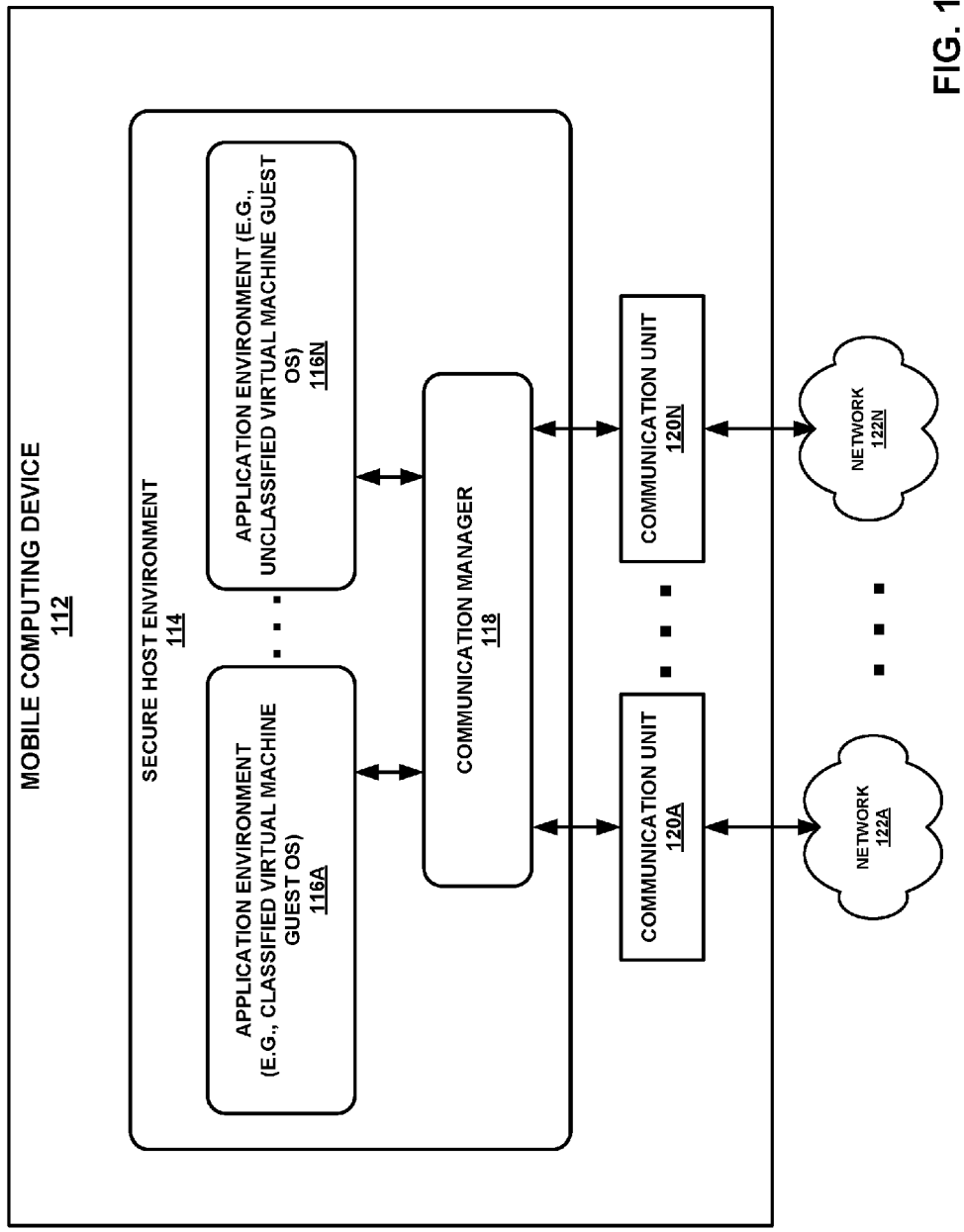
FIG. 1 is a block diagram illustrating an example mobile computing device that is configured to provide support for multiple different application environments, or personas, in a secure host environment, in accordance with one or more aspects of the present disclosure.

FIG. 1 is a block diagram illustrating an example mobile computing device 112 that is configured to provide support for multiple different application environments, or personas, in a secure host environment 114, in accordance with one or more aspects of the present disclosure. As illustrated in FIG. 1, mobile computing device 112 may be configured to provide a secure host environment 114, where mobile computing device 112 includes a group of communication units 120A-120N (collectively, "communication units 120). Communication units 120 are configured to communicate with different communication networks 122A-122N, respectively (collectively, "networks 122"). Communication networks 122 may comprise one or more physical communication networks.

Secure host environment 114 may, in some examples, comprise a virtual machine host environment that hosts one or more virtual machines. As shown in FIG. 1, secure host environment 114 includes a group of application environments 116A-116N (collectively, "application environments 116) and a communication manager 118. Secure host environment 114 provides the framework for supporting and isolating distinct application environments, or personas, 116. For instance, as one non-limiting example, application environment 116A may be configured to handle classified data and applications and to communicate with classified networks, while application environment 116N, which is separate and distinct from application environment 116A, may be configured to handle unclassified data and applications and to communicate with unclassified networks. As will be described in the example of FIG. 2, application environments 116 and communication manager 118 may each be implemented as guest virtual machines or containers under the control of secure host environment 114.

Application environments 116 may, in various examples, have little to no direct hardware access in mobile computing device 112, where communication instead is directed through communication manager 118. Communication manager 118 is capable of providing load balancing, transparent fail-over when media communication is interrupted, and/or tunneling (e.g., virtual private network (VPN) tunneling), when available, to leverage communication media at different security levels, depending on which of application environments 116 is an active environment. In some cases, such as shown in FIG. 2, secure boot functionality is also provided in mobile computing device 112 and/or secure host environment 114, and secure host environment 114 may also include an application environment/resource manager or managers, as described in further detail below.

Secure host environment 114 may use hardware virtualization to maintain strict control over resource allocation, hardware access, communication, and security. Each application environment of application environments 116 may, as noted above, comprise a virtual machine guest encompassing a complete operating system (OS), applications, and data storage to create a standalone environment at a particular security level. In other examples, some or all of a given application environment (e.g., one of application environments 116, communication manager 118) may comprise a virtual container that may or may not execute a complete guest operating system separate from a host operating system of mobile computing device 112. In some cases, each of application environments 116 may have no cross-domain data path, and storage space provided by mobile computing device 112 may be allocated separately for each of application environments 116. Secure host environment 114 may encrypt all storage, protecting itself and application environments 116.

Figure 2:
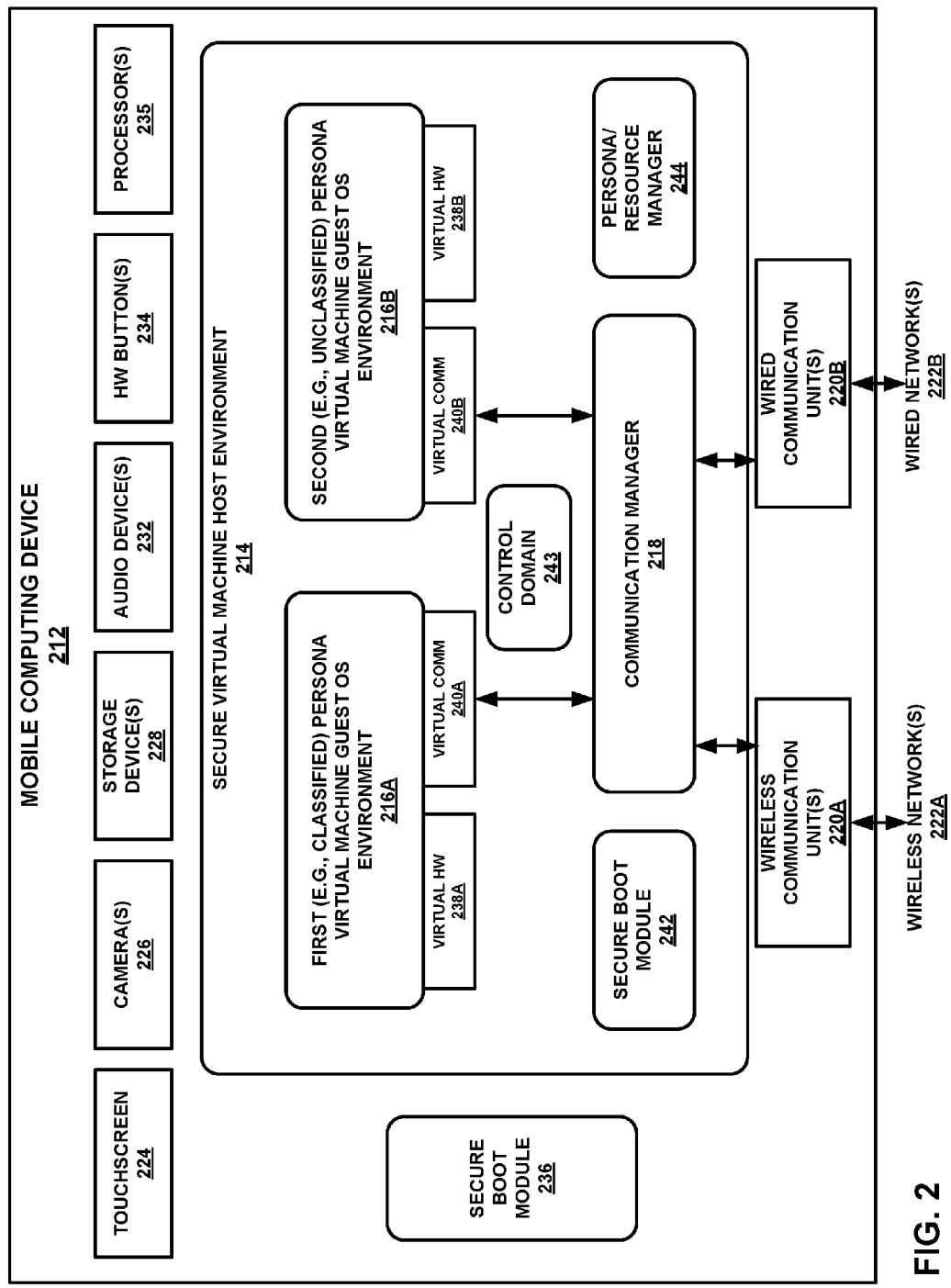
FIG. 2 is a block diagram illustrating further details of one example of the mobile computing device shown in FIG. 1, in accordance with one or more aspects of the present disclosure.

In some examples, secure host environment 114 may include an application environment/resource manager, such as persona/resource manager 244 shown in FIG. 2. Such an application environment/resource manager may, in various cases, enable a user of mobile computing device 112 to switch from, e.g., an active foreground application environment (e.g., application environment 116A) to a different application environment (e.g., application environment 116N), such as by the user interacting with a hardware or graphical user interface element (e.g., button) provided by mobile computing device 112. According to one or more examples of the present disclosure, by assuming exactly one active application environment (e.g., persona) at any given moment, various resources of mobile computing device 112 (e.g., processors, memory) may be fully available to certain foreground tasks, helping ensure an optimal user experience. Such an implementation may also simplify security domain isolation by eliminating back-channel communication between domains that are associated with application environments 116. As one example, if one of application environments 116 transitions from an active to an inactive (e.g., suspended) state, such as application environment 116A, state information of any resources utilized by this application environment 116A (e.g., processors, memory) may be stored to data stores (e.g., encrypted and/or persistent storage), and can be reloaded in potentially short order when application environment 116A becomes active once again. In addition, communication manager 118 and/or a resource manager (e.g., persona/resource manager 244 shown in FIG. 2) may prohibit any communication with an inactive persona.

This approach allows application environments 116 to be switched potentially more responsively than would be possible if every switch resulted in a reboot of a guest operating system associated with one or more of application environments 116, and allows application environments 116 to be started quickly even after a power down event. The application environment/resource manager may also oversee memory and persistent storage allocation, reserving constrained resources of mobile computing device 112 and determining resource needs of application environments 116 over time, prior to allocation. In some examples, one or more of application environments 116 may be active at a given time. Much of the state information of an individual one of application environments 116 may exist within, e.g., its virtual disk image, except for, in certain cases, ephemeral state residing in main memory and peripherals, such as disk caches or hardware registers, which may be flushed and/or reset when a given application environment is moved to an inactive state.

Communication manager 118 of secure host environment 114 may perform various different functions. First, communication manager 118 enables the respective operating systems of application environments 116 to operate with a defined concept of available communication networks available to mobile computing device 112, so these operating systems and their contained applications do not necessarily need to react to varying connectivity as mobile computing device 112 moves from one connectivity domain to another. Communication manager 118 may also be configured to utilize one or more algorithms to optimize message delivery from application environments 116 to computing devices external to mobile computing device 112, as well as providing load balancing. In addition, in one or more examples, communication manager 118 may provide at least two-layer encryption of data, such as described in further detail below, and may also ensure that mobile computing device 112 communicates only via authenticated gateways to networks appropriate to the active application environment of application environments 116. For example, if application environment 116A is active and is associated with a classified domain, communication manager 118 may determine that traffic originating from application environment 116A is directly forwarded to classified networks. If, however, load balancing criteria and/or current connectivity state indicates that the currently available and/or best route (e.g., lower latency and/or higher bandwidth) is via a secure but unclassified network, communication manager 118 may determine to encrypt and forward all data via a virtual private network (VPN) gateway. In this example, application environment 116A does not necessarily need to be aware of the VPN or of the route taken by the communication.

In certain non-limiting examples, as will be described in further detail below, persona/resource manager 244 and/or communication manager 118 may receive an indication of a selection of a first application environment from application environments 116. This first application environment may comprise a first virtual environment (e.g., virtual machine environment, container) that is associated with a first security domain, and the first application environment may not be currently executing on mobile computing device 112. At a particular point in time, secure host environment 114 may be reconfigured so this first application environment becomes active, while a second application environment of application environments 116 may be transitioned from an active to inactive state (e.g., based on input from an application environment/resource manager, such as persona/resource manager 244 shown in FIG. 2). Secure host environment 114 may, responsive to receiving the indication of the selection of the first application environment, suspend execution of the second application environment, where the second application environment is different from the first application environment, and where the second application environment comprises a second virtual environment (e.g., virtual machine environment, container) that is associated with a second security domain different from the first security domain. Contemporaneously, communication manager 118 may reconfigure to prevent communication to and from the second application environment via communication units 120.

After suspending execution of the second application environment, secure host environment 114 may initiate execution of the first application environment, where the first application environment may be configured to isolate execution of one or more software applications within the first application environment, and communication manager 118 may be configured to identify information associated with the first security domain and provided by the first application environment that is to be sent to an external computing device associated with the first security domain. In addition, communication manager 118 may select one or more communication networks from communication networks 122 that are available to mobile computing device 112 for data communication. The selecting may be based on one or more criteria associated with at least one of the information associated with the first security domain or communication networks 122. Communication manager 118 may encrypt, based on the first security domain and the selected communication network(s), the information to generate encrypted information that is associated with the first security domain, and send, to the external computing device, via the selected communication network(s) (e.g., using one of communication units 120), the encrypted information.

As a result, the techniques of the present disclosure may improve usability of mobile computing device 112. Application environments 116 may comprise independent environments or personas that are respectively associated with different security domains having separate operating systems, configurations, applications, and data securely isolated in each respective domain. Different operating systems and/or types of operating systems may be provided in different ones of application environments 116. The use of secure host environment 114 may enable a potentially fast transition between active and inactive states for respective ones of application environments 116 to allow efficient access to applications and data in different respective domains. Secure host environment 114 may suspend a currently active application environment of application environments 116 to move it from an active to inactive state, and may also unsuspend a currently inactive application environment of application environments 116 to move it from an inactive to an active state.

The techniques may also provide both data-at-rest encryption and data-in-transit encryption. Data-at-rest encryption may be imposed without involvement by the user of mobile computing device 112 and/or application environments 116 to ensure data is secure. By utilizing such data-at-rest encryption, in various examples, mobile computing device 112 to be treated as "unclassified" when powered off when application environments 116 include both an "unclassified" and a "classified" environment. In some cases, data-at-rest encryption conforms with Commercial Solutions for Classified (CSfC) guidelines. Communication manager 118 may be further configured to provide data-in-transit encryption, presenting virtual communication interfaces to application environments 116 and enforcing redirection of network communication from application environments 116 to any available communication media, regardless of security level, and employing CSfC-compliant encryption of data-in-transit in certain cases. Data-in-transit encryption may enable communication from applications in an application environment at one security classification to transit media at a different classification (e.g., subject to VPN availability).

Communication manager 118 is also configured, in certain examples, to ensure that each one of application environments 116 is limited to sending or receiving communications within its respective security domain. Application environments 116 and/or communication manager 118 may also support dynamic data type tagging or categorization, and management of all available communication media in an effort to minimize latency, maximize bandwidth, and prioritize traffic according to data type, as described in further detail below. With respect to dynamic data type tagging or categorization, communication manager 118 enables dynamic categorization of data between application environments 116 and external media to allow policies to be applied according to, e.g., priority and latency considerations.

FIG. 2 is a block diagram illustrating further details of an example mobile computing device 212, which is one non-limiting example of mobile computing device 112 shown in FIG. 1, in accordance with one or more aspects of the present disclosure. Mobile computing device 212 includes a secure virtual machine host environment 214, which is one example of secure host environment 114 shown in FIG. 1. Mobile computing device 212 also includes one or more wireless communication units 220A and one or more wired communication units 220B, which are examples of communication units 120 shown in FIG. 1. Mobile computing device 212 uses wireless communication units 220A to communicate with one or more wireless networks 222A, and mobile computing device 212 uses wired communication units 220B to communicate with one or more wired networks 222B. Wireless networks 222A and wired networks 222B (collectively, "networks 222") are examples of communication networks 122 shown in FIG. 1.

Mobile computing device 212 further includes a secure boot module 236, which will be described in further detail below. In addition, mobile computing device 212 includes a touchscreen 224, one or more cameras 226, one or more processors 235, one or more storage devices 228 (which may include memory), one or more audio devices 232, and, in some examples, one or more hardware buttons 234. Audio devices 232 may include one or more input (e.g., microphone) and/or output (e.g., speaker) audio devices. Storage devices 228 store data used by secure boot module 236 and secure virtual machine host environment 214, including first persona 216A and second persona 216B. Storage devices 228 may also store data used by or associated with any of the other elements included in mobile computing device 212 shown in FIG. 2. In addition, storage devices 228 may store instructions that are executable by one or more processors of mobile computing device 212 to implement the functionality of secure boot module 236 and secure virtual machine host environment 214 (including first persona 216A, second persona 216B, secure boot module 242, communication manager 218, and/or persona/resource manager 244).

First persona 216A and second persona 216B may each comprise a virtual machine guest operating system (OS)

environment provided in secure virtual machine host environment 214, and may be examples of application environment 116A and 116N shown in FIG. 1. First persona 216A and second persona 216B may provide distinct operating system environments that may implement either the same of different operating systems. Secure virtual machine host environment 214 employs an environment to provide the basis for supporting and isolating two distinct personas, namely first persona 216A and second persona 216B. First persona 216A may be configured to handle classified data and applications and to communicate directly with classified networks, while second persona 216B may be configured to handle unclassified data and applications and to communicate directly with unclassified networks.

In various examples, first persona 216A, second persona 216B, communication manager 218, and persona/resource manager 244 may be isolated as guest virtual machines under the control of the secure virtual machine host environment 214. Personas 216A and 216B may have no direct hardware access, and all communication is directed through communication manager 218, such as described in reference to FIG. 1. First persona 216A may provide a virtual hardware interface 238A and a virtual communication interface 240A, while second persona 216B may provide a virtual hardware interface 238B and a virtual communication interface 240B. First persona 216A communicates with communication manager 218 via virtual communication interface 240A, while second persona 216B communicates with communication manager 218 via virtual communication interface 240B. Communication manager 218 may implement load balancing, transparent fail-over when media communication is interrupted, and VPN tunneling when available to leverage a communication media at a different security level than the active persona (e.g., one of first persona 216A or second persona 216B). Communication manager 218 may operate in a separate execution domain with respect to personas 216A, 216B, and may control respective virtualized communication channels between communication manager 218 and personas 216A, 216B to limit access by personas 216A, 216B to one or more resources of mobile computing device 212. For example, communication manager 218 may control one or more virtualized communication channels with persona 216A via virtual communication interface 240A, and may control one or more virtualized communication channels with persona 216B via virtual communication interface 240B. Virtual hardware interface 238A may serve as an interface to one or more resources of mobile computing device 212 that may be made available to persona 216A, and virtual hardware interface 238B may serve as an interface to one or more resources of mobile computing device 212 that may be made available to persona 216B.

Secure virtual machine host environment 214 may use hardware virtualization to maintain strict control over resource allocation, hardware access, communication, and security. Each persona 216A, 216B may be a virtual machine encompassing a complete operating system, applications, and data storage needed to create a standalone environment at a particular security level. Secure boot module 236 of mobile computing device 212 may provide secure boot functionality to serve as a hardware root of trust. Secure boot module 236 may include a Trusted Platform Module (TPM) and may also provide full-disk encryption. The TPM helps ensures that the hardware virtualization solution is tamper-proof by checking cryptographically created signatures for the bootloader and kernel. Full-disk encryption helps ensure encryption of data at rest (e.g., CSfC compliant encryption), which can be implemented efficiently with, e.g., a single additional layer of software encryption. Secure boot module 236 may prevent any unauthorized, modified software from being booted on mobile computing device 212, which may allow backdoors or password capture to be introduced. The TPM may, in various examples, implements secure key storage for key encryption keys to ensure no keys are usable except following user verification and to verify all keys used by secure virtual machine host environment 214 are generated by an approved authority. Secure boot module 236 verifies that the initial boot software is signed by a trusted authority, as well, and also that the software has not been modified after being signed.

Secure virtual machine host environment 214 may include its own secure boot module 242. Secure boot module 242 may include software that calculates secure hashes of software components and personas (e.g., first persona 216A and second persona 216B), and securely verifies signatures before loading components or starting personas. To do this, according to one or more examples, a CSfC approved digital signature algorithm, such as Elliptic Curve Digital Signature Algorithm (ECDSA), may be employed to generate signatures for each software component in secure virtual machine host environment 214 using a secret key. These signatures can be verified on every boot before the respective component is used. Only the public key used for verifying the signature may be located or stored on mobile computing device 212. The signing key may not be kept on mobile computing device 212, according to various examples. Similar signing may be performed on persona disk images to detect unauthorized modification, and this functionality may be performed by persona/resource manager 244.

Persona/resource manager 244 enables a user to switch from an active foreground persona to a different persona for the foreground e.g., at the touch of a hardware button or via another form of user interaction with mobile computing device 212, such as via a graphical user interface. If a graphical user interface is provided by mobile computing device 212 (e.g., using touchscreen 224), persona/resource manager 244 may control the display and input while the user makes choices. In one or more examples, by providing exactly one active persona, secure virtual machine host environment 214 helps enable an optimal user experience, because various resources (e.g., processors, memory) are fully available to foreground tasks. Secure virtual machine host environment 214 also simplifies security domain isolation by eliminating back-channel communication between domains, but can, in some examples, allow multiple personas at the same classification level (e.g., multiple different classified or unclassified personas) to be active at the same time. When a persona transitions from an active to an inactive state, the state of the active persona may be snapshotted to encrypted persistent storage, and may be reloaded once the persona becomes active again. This approach allows personas to be switched more responsively than would be possible if every switch required a reboot of a guest operating system, and allows personas to be started quickly even after a power down event. Persona/resource manager 244 also oversees the memory and persistent storage allocation, reserving constrained resources and determining persona needs over time before allocating them.

As described previously, secure virtual machine host environment 214 enables multiple distinct operating system environments to operate, presented as personas 216A and 216B, which address different operational needs. Personas 216A and 216B are isolated from each other and from any hardware access that could allow data to transit between security domains, especially communication media.

In certain non-limiting examples, one or more of personas 216A or 216B implements a Linux guest operating system. Control domain 243 provides control of secure virtual machine host environment 214 and the guest operating systems implemented by personas 216A and 216B. In certain non-limiting examples, secure virtual machine host environment 214 comprises a virtualization hypervisor (e.g., a Xen virtualization hypervisor). Xen can be used as a Type-1 hypervisor, allowing the hypervisor attack surface to be kept small. Control domain 243 may be executed in a virtual machine run under Xen, with communication channels defined by the Xen application programming interface.

In certain non-limiting examples, creating a persona (e.g., first persona 216A, second persona 216B) may be a multi-step process, which may be performed in secure virtual machine host environment 214 or control domain 243 via configuration and/or via user input. First, a configuration file specific to a single virtual machine (e.g., persona) may be created. This configuration file may specify memory size of the virtual machine and a virtual disk image representing the virtual machine hard drive. A virtual disk image may be created. This image can, in some cases, be either one or more physical partitions, separate from the host operating system but on the same or different physical disk drive, or it can be one or more file images, which may be treated as a disk drive that is partitionable. A virtual install media image may then be booted, and the operating system may be installed to the virtual disk image. Alternatively, a byte-wise copy of an existing disk image or physical partition can be performed to create a duplicate of an existing bootable virtual machine. The virtual disk image may then be booted.

In one example, Xen optionally provides direct access to Peripheral Component Interconnect (PCI) peripherals. Control domain 243 may, in some examples, use this option to provide one or more of personas 216A, 216B direct access to a graphics card of mobile computing device 212, which may provide three-dimensional graphics rendering acceleration or other performance improvements.

As noted above, each persona 216A, 216B may have a virtual disk image, and this image can, in some cases, be either one or more physical partitions, separate from the host operating system but on the same or different physical disk drive, or it can be one or more file images, which may be treated as a disk drive that is partitionable. In various examples, control domain 243 will provide file images as the virtual disk images for personas 216A and 216B. Disk image files may be created and replaced administratively, facilitating administrative oversight of mobile computing device 212, such as pushing updated, clean versions of personas 216A and/or 216B when, for example, operating systems or applications are to be updated. In some examples, secure virtual machine host environment 214 or control domain 243 may also support image overlays and appending multiple files to increase the storage available to a persona filesystem by specifying multiple files in the individual persona's virtual machine configuration file. These may be presented by secure virtual machine host environment 214 to persona 216A or 216B as a single filesystem, despite existing as separate disk image files in the secure virtual machine host environment 214 filesystem. In addition, file images located in the secure virtual machine host environment 214 filesystem may be subject to software full disk encryption, as described in further detail below.

While overlays provide one approach to expanding the storage available to persona 216A or 216B, an alternative is to create multiple images as disk partitions that can be mounted by the persona operating system at mount points in its filesystem. The configuration file specific to a given persona (e.g., persona 216A or 216B) may allow disk images to be either read-only or read-write, and may allow different disk images to be presented as different disk partitions to the persona. Secure virtual machine host environment 214 can use this ability to protect persona applications and the base operating system from changes.

In some examples, secure virtual machine host environment 214 may enable one-way communication of information via virtualized storage and between personas 216 by assigning different access rights (e.g., read-only, read-write) to different ones of personas 216. For example, second (e.g., unclassified) persona 216B may be able to effectively share data with first (e.g., classified) persona 216A, even if only one of personas 216A or 216B is active at a given time. In this example, using a selected hardware virtualization solution would allow different configurations mounting the same virtual disk image (e.g., partition) as, e.g., read-only in persona 216A and read-write in persona 216B. The virtual disk image may be encrypted appropriately for, e.g., classified data storage using the same approach as the personas.

In some examples, mobile computing device 212 may use two independent layers of encryption, namely hardware full-disk encryption and software full-disk encryption. Two different methods of protecting encryption keys may also be used in mobile computing device 212: a password and a smartcard. In these examples, because all guidelines in the CSfC Data-At-Rest Capability Package are followed, including key protection and secure boot, mobile computing device 212 can be handled as unclassified equipment when powered off or when running an unclassified persona (e.g., second persona 216B). In certain examples, secure boot module 236 may perform at least a portion of the hardware full-disk encryption. In some examples, secure virtual machine host environment 214 or control domain 243 may perform at least a portion of the hardware and/or software full-disk encryption.

Software full-disk encryption may be applied in control domain 243 (e.g., Xen control domain) to all partitions. Different encryption keys may be used for different partitions, if persona virtual disk images are stored on separate partitions, and loaded in control domain 243 when needed. The software full-disk encryption keys may be protected by a user smartcard or common access card (CAC), while the hardware full-disk encryption may be protected by a user password. By using the smartcard to protect software full-disk encryption, secure virtual machine host environment 214 enables the user to switch personas without necessarily needing to re-enter a user password to unlock additional keys for different partitions.

Communication manager 218 may, in many examples, handle all network data sent and received by mobile computing device 212. One purpose of communication manager 218 is to ensure that data communication from and to mobile computing device 212 is not only secure but also leverages available communication media (e.g., available networks, such as one or more wireless networks 222A and one or more wired networks 222B shown in FIG. 2) in an efficient manner.

Communication manager 218 may implement various security features. Communication manager 218 may encrypt data using the correct encryption keys based on the source of data itself, which is the current active persona (e.g., persona 216A or 216B). For example, if first persona 216A is a persona associated with classified domain data, communication manager 218 may encrypt any data sent from first persona 216A using one or more encryption keys associated with this particular classified domain. If second persona 216B is a persona associated with unclassified domain data, communication manager 218 may encrypt any data sent form second persona 216B using one or more encryption keys associated with this particular unclassified domain.

Communication manager 218 may provide data isolation, such that data communication cannot be leaked from one persona to the other. Communication manager 218 may also provide one or more firewalls to prevent any unauthorized external network access (e.g., attempted access via wireless networks 222A or 222B) to mobile computing device 212. Based on administrative control provided by communication manager 218, communication manager 218 may also ensure that certain kinds of traffic can only be routed through a specific communication medium (e.g., via wired network 222B), or inside a specific network setting. Such functionality may be based or dependent on which of personas 216A or 216B is currently active.

Communication manager 218 may also implement various features in efforts to optimize network resource utilization for mobile computing device 212, such as link failover and load balancing. For example, for link failover, if one link fails or suffers degradation in quality, communication manager 218 may switch to another or better link based on type of traffic and link metrics. For example, if first persona 216A is currently the active persona, and communication manager 218 is currently using one of wireless communication units 220A to send data from first persona 216A to one of wireless networks 222A, it is possible that this wireless network may experience a failure. In this case, if one of wired networks 222B is available, communication manager 218 may switch and use one of wired communication units 220B to send data from first persona 216A to this wired network. Communication manager 218 may also switch, in some cases, to another one of wireless networks 222A if available.

For link failover situations, depending on the scenario and the configuration, communication manager 218 may, in some cases, transparently create a new VPN client for one of wireless communication units 220A or wired communication units 220B to tunnel encrypted traffic to a VPN gateway appropriate for the data type and link. For example, if first persona 216A is a classified persona, and communication manager 218 uses wireless communication units 220A or wired communication units 220B to send data from first persona 216A to a classified server using an unclassified network (e.g., one of wireless networks 222A or wired networks 222B), communication manager 218 may tunnel encrypted traffic to a VPN gateway that is communicatively coupled to this classified server.

Communication manager 218 may also implement load balancing across available ones of wireless networks 222A and wired networks 222B, utilizing one or more load-balancing techniques, criteria, or algorithms, such as techniques, criteria, and/or algorithms known in the art. If more than one link is available at a given time, both of them can, in some cases, be used simultaneously to increase the overall bandwidth available to mobile computing device 212. Communication manager 218 may also allow different types of traffic from persona 216A or 216B to go through different links (e.g., wireless networks 222A, wired networks 222B) based on the optimal or selected link for data type or traffic originating from persona 216A or 216B. To do so, communication manager 218 may identify the type of data sent from persona 216A or 216B based on data tagging, as will be described in further detail below. Communication manager 218 may also, in some examples, continuously estimate bandwidth, latency, and packet loss based on monitoring persona traffic or additional algorithms so that potentially the best media is used at all times from mobile computing device 212.

Communication manager 218 may work with the persona/resource manager 244 to ensure transparent and secure transition of communications when switching from one persona to the other. When a persona is inactive, communication manager 218 may disable all communication from/to that persona, sanitize the network stack, and unload the configuration and encryption keys associated with that persona's communication. The communication paths for the inactive persona may be disabled in parallel with freezing the operating state/file image of the persona, to be completed before the next persona is started and activated in some examples, guaranteeing that data communication is isolated and that data from different personas do not traverse overlapping paths.

In various examples, communication manager 218 may comprise a virtual machine to isolate communication control from other parts of secure virtual machine host environment 214. In these examples, after the secure boot module 236 boots mobile computing device 212, secure virtual machine host environment 214 (e.g., using control domain 243) starts communication manager 218 before starting persona 216A or 216B. Communication manager 218 has responsibility for all communication, including communication via control domain 243. Communication devices of mobile computing device 212 may not be accessible in control domain 243. In some examples, if persona/resource manager 244 is remotely configurable, even control domain communication passes through communication manager 218 and may be secured by data-in-transit encryption (e.g., CSfC compliant data-in-transit encryption) and gateway authentication enforced by communication manager 218. Thus, in various examples, communication manager 218 may be executed in a virtual environment on mobile computing device 212, which is isolated from application environments (e.g., personas 216) and user control or modification. Communication manager 218 may be subject to modification by secure, encrypted communications with a remote administrative device, which is remote from mobile computing device 212.

In various examples, persona/resource manager 244 may provide multiple services running in control domain 243 (e.g., Xen control domain), which may have direct access to hardware of mobile computing device 212 that is not available to personas 216A, 216B. In certain non-limiting examples, configuration of persona/resource manager 244 and/or communication manager 218 may be privileged and performed either by an administrator with physical possession of mobile computing device 212 or by authorized personnel via a secure remote connection to mobile computing device 212.

Persona/resource manager 244 may have various functions or responsibilities, such as persona switching between personas 216A and 216B (including hardware sanitization and data-at-rest key management), persona resource allocation oversight, and/or persona filesystem protection and signature validation. Persona switching is triggered automatically or by a user when the user wishes to change the active persona from one of persona 216A or 216B to the other of persona 216A or 216B (e.g., via a graphical user interface or a hardware button, such as one of hardware buttons 234).

Persona/resource manager 244 may also be responsible for managing data-at-rest encryption, such as, for example, by employing two layers of encryption involving hardware full-disk encryption and software full-disk encryption. Security may be further implemented by employing different disk partitions for each persona 216A and 216B, with different encryption keys for each partition. Persona/resource manager 244 can load and unload encryption keys associated with software full-disk encryption depending on which persona is active, making the data of inactive personas safely encrypted and inaccessible to other personas. Encryption keys may be protected by different factors (e.g., two factors in compliance with the CSfC guidelines) for protecting encryption keys differently for different layers. The hardware full-disk encryption may, e.g., require a password to unlock the keys protecting the hard disk. The software full-disk encryption may, e.g., be integrated with smartcard support, requiring the user's smartcard or other similar mechanism to be physically plugged into mobile computing device 212 to unlock the software encryption keys. When a persona switch occurs, persona/resource manager 244 may write the snapshot file to the partition containing the main persona filesystem for the outgoing persona, and then unload the related encryption keys. A snapshot file may encompass the transitory state of a virtual machine (e.g., persona) including, e.g., random access memory, central processing unit state, hardware peripheral registers and memory, and/or other state information. It may then load the encryption keys for the incoming persona and load the snapshot file associated with the new persona.

Persona/resource manager 244 may also oversee any direct hardware access provided to the active persona. Any hardware device that is not fully virtualized or emulated by control domain 243 may be re-initialized to ensure that no data leakage occurs. Cleanup involves unloading and loading device modules and issuing other operating system commands that control hardware. This might involve saving the state information of a hardware device and then sanitizing it before allocating it to the next persona.

An alternative to saving the state information and restoring the state of hardware by persona/resource manager 244 is to have the guest operating system of persona 216A or 216B perform this in its space, using its virtual hard disk for storage, by inducing the persona operating system to invoke its hibernate or sleep function before persona/resource manager 244 uses control domain 243 to suspend the persona state. The hardware may still be sanitized by persona/resource manager 244. When a persona switch occurs, persona/resource manager 244 may notify communication manager 218 so it can disable communication pathways not applicable to the new active persona and change data categorization and prioritization policies based on the active persona.

Persona/resource manager 244 also oversees allocating and reallocating resources. It does this, according to certain examples, by creating virtual disk image files in control domain 243, which can then be uniquely assigned to persona 216A or 216B (e.g., via a persona-related configuration file). Persona/resource manager 244 may be responsible for allocating additional virtual disk image files and for modifying the configuration for a specific persona to add new disk images to the persona disk configuration. Personas 216A and/or 216B may also monitor disk usage and induce persona/resource manager 244 to add new virtual disk space. Persona/resource manager 244 can also use the capabilities of control domain 243 (e.g., Xen configuration) to mount additional virtual disk files at specific mount points within a root filesystem to present additional storage to a given persona. This may, in certain cases, be useful for certain types of data (e.g., mission specific data), where after data loses value, a smaller virtual disk file can be mounted in its place and the old virtual disk file can be deleted to free up the disk space for other personas. Such an operation could be performed either at the behest of an administrator, or possibly in coordination with a user application running in each persona, which may only have the ability to release mounted virtual disks associated with that particular persona. Sanitization may be performed on release. Persona/resource manager 244 may also modify a persona's configuration when additional memory is needed.

Persona/resource manager 244 may also be configured to oversee the security of personas 216A and 216B. For example, persona/resource manager 244 may generate cryptographic hash signatures for inactive persona filesystems and verify they are not changed between activations. Persona/resource manager 244 may also apply read-only protection from control domain 243 to portions of the persona filesystem that should not change. The persona filesystems are in control domain 243, in non-limiting examples in which persona/resource manager 244 operates using virtual disk images for persona 216A and/or 216B. When an active persona is suspended, the virtual disk image associated with the persona may be static and a cryptographic hash function can generate a signature that can be checked before the persona is next active. Because the cryptographic hash function may, in some cases, be slow compared to persona switching, the signature may, in these cases, be checked as a background task, and any unexpected change may cause functions of persona/resource manager 244 to mark the respective persona as compromised and to be unwilling to restart the persona. File permissions can be used to change the persona related files to read-only during the time when the persona is not active, such as to protect it from change. In such fashion, an active persona may be prohibited from modifying the virtual disk image associated with the inactive persona.

In various non-limiting examples, a directory containing read-only files, such as /bin or /lib, may be moved from a primary disk image file to a separate disk image file, and may be subsequently configured read-only in the configuration file of control domain 243 for the persona 216A or 216B. The disk image file for the root filesystem may be mounted read-write, and read-only directories can be added by configuration as additional "disk partitions" to be mounted by the persona operating system. Read-only virtual disk images may have signatures generated once by persona/resource manager 244.

In non-limiting examples, read-only protection of system files can, in some cases, involve multiple layers (e.g., four layers) of protection from three roles: the persona (e.g., persona 216A or 216B), control domain 243, and the control domain filesystem where virtual disk images are stored. For example, the following four layers of protection may be provided via the following: (1) the file permissions in the persona operating system marks each file that it is read-only; (2) the persona mount configuration mounts the disk partition (represented to control domain 243 as a virtual disk image, but to the persona as a partition) as a read-only mount; (3) the persona virtual machine configuration specifies the disk image file is read-only, so control domain 243 refrains from writing changes to the disk image; and (4) the host filesystem permission can mark the disk image file as read-only, so the host operating system refrains from writing changes to the disk image.

In these non-limiting examples, of the four layers, two may be enforced by the persona operating system. The third layer uses capabilities of control domain 243 to externally enforce file modification permissions, and the fourth layer uses the host operating system. These enforcement mechanisms may, in many cases, not be circumvented by a persona user or process. This layered protection of data access provides an opportunity for safe cross-domain data access overseen secure virtual machine host environment 214. A disk image file could be allocated to represent storage for data exchange. Data exchange may, in some cases, only be allowed from, e.g., an unclassified persona to a classified persona. This disk image file can be specified as read-only access in the classified persona, but as read-write in the unclassified persona. It may be mounted as a disk partition at some mount point in both personas. Because the image access is read-only for the classified persona, externally enforced by control domain 243, there is minimal-to-no risk of data flowing from the classified persona to the unclassified persona, including through back-channels. This is because the classified persona is prohibited from modifying the disk image file. In addition, because only one persona may be active at a time (according to various examples), and because only the unclassified persona is performing writes in this example, there may be no risk of disk image corruption.

Figure 3:
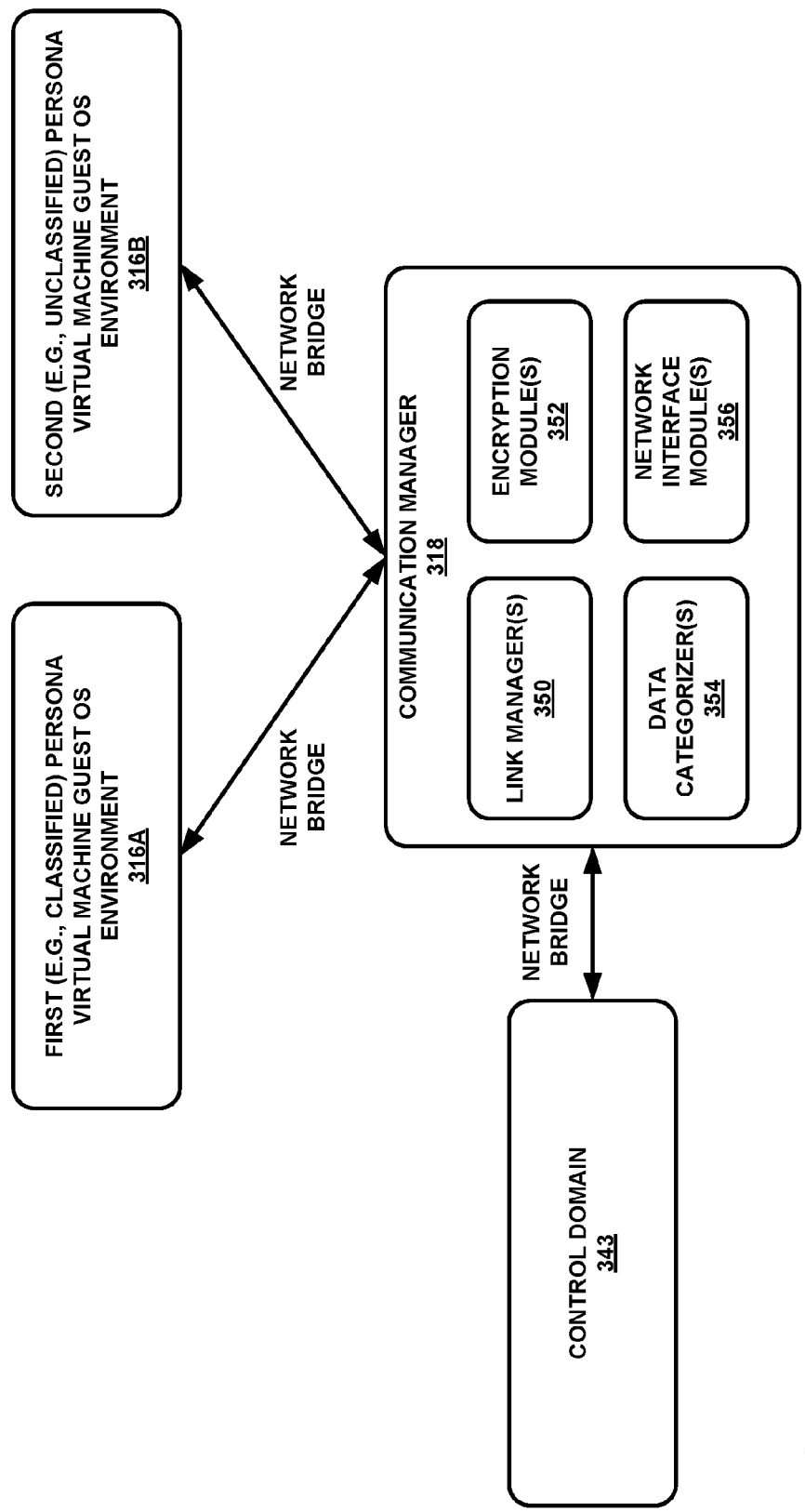
FIG. 3 is a block diagram illustrating further example details of a communication manager, in accordance with one or more aspects of the present disclosure.

FIG. 3 is a block diagram illustrating further example details of a communication manager 318, in accordance with one or more aspects of the present disclosure. Communication manager 318 may be one example of communication manager 118 (FIG. 1) or communication manager 218 (FIG. 2). FIG. 3 illustrates communication manager 318, control domain 343, first persona 316A, and second persona 316B. Control domain 343 may be one example of control domain 243 shown in FIG. 2. First persona 316A and second persona 316B may be examples of first persona 216A and second persona 216B, respectively, as shown in FIG. 2.

As illustrated in FIG. 3, communication manager 318 is communicatively coupled to control domain 343, e.g., via an internal network bridge that connects virtual network interfaces in both domains. Communication manager 318 is also communicatively coupled to first persona 316A and second persona 316B via respective internal network bridges. Similar to first persona 216A, first persona 316A shown in FIG. 3 may comprise a virtual machine guest OS environment that is associated with a classified security domain. Similar to second persona 216B, second persona 316B shown in FIG. 3 may comprise a virtual machine guest OS environment that is associated with an unclassified security domain.

In various examples, only one respective network bridge is visible to or usable by a given persona 316A or 316B, and all communication for the persona 316A or 316B is handled through its respective bridge regardless of the number or the availability of external network links available to communication manager 318. Each persona 316A and 316B may use a respective virtual communication interface (e.g., interface 240A, 240B shown in FIG. 2) to communicate with communication manager 318 via a respective network bridge. Communication manager 318 also maintains a network bridge to communicate control and configuration messages with control domain 343.

As shown in FIG. 3, communication manager 318 includes one or more link managers 350, one or more encryption modules 352, one or more data categorizers 354, and one or more network interface modules 356. Each respective encrypt module of encryption modules 352 is responsible for initiating and configuring any VPN tunnels to ensure all data communication is secured and, in some cases, conforming to the CSfC guidelines. In some examples, each persona 316A and 316B has its own corresponding encryption module in communication manager 318. In these examples, encryption modules 352 include at least two different modules—a first encryption module for first persona 316A, and a second encryption module for second persona 316B. If first persona 316A is a persona associated with a classified security domain, the corresponding first encryption module of encryption modules 352 is responsible for encrypting data provided by first persona 316A using appropriate keys and/or algorithms associated with this classified security domain. Similarly, if second persona 316B is a persona associated with an unclassified security domain, the corresponding second encryption module is responsible for encrypting data provided by second persona 316B using appropriate keys and/or algorithms associated with this unclassified security domain.

In addition to encrypting all data communication, extra measures may be taken to harden the security of communication manager 318. For example, firewalls may be used to protect communication manager 318 from any unauthorized access. To help prevent leakage of information between personas 316A and 316B, in some cases, only the network resources (e.g., network bridge, devices) and the encryption module of encryption modules 352 associated with the currently active persona are kept active. When a persona is inactive, its network bridge is disabled in control domain 343, and its respective VPN tunnel is disabled by the respective encryption module of encryption modules 352. From that point on, in various examples, no communication may be possible in or out of that persona until it is activated again and all of its network and VPN configuration are restored by control domain 343 and communication manager 318.

Communication manager 318 may use certificate pinning to maintain signed and validated certificates for each of its VPN gateways (e.g., gateways illustrated in FIGS. 4A-4D). When establishing a VPN tunnel, the certificate presented by the gateway, at the other end of a possible VPN tunnel, is checked against the one pinned by communication manager 318. The tunnel may, in many examples, be created only if the certificate passes validation by communication manager 318. This check may be performed on all links for all configured gateways.

To further isolate the communication paths of first and second personas 316A and 316B, communication manager 318 may use a separate network stack for each persona. Virtual routing and forwarding (VRF) may be used to achieve this. VRF allows multiple instances of routing tables to exist and work simultaneously. When combined with network name spaces, a Linux kernel feature, VRF may create a completely isolated network stack from the device level to the software level, according to one or more non-limiting examples. As a result, during transition periods between personas 316A and 316B, or even if personas 316A and 316B are running at the same time, in these examples, communication data of each person 316A and 316B may be handled by completely isolated processes in separate memory spaces, so the data from the personas 316A and 316B do not traverse overlapping paths or share any queues or network resources.

Communication manager 318 may employ different technologies to improve the quality of communication, such as link failover, optimal link selection, load balancing, and/or data prioritization. Communication manager 318 may configure and control whether any of these technologies are used, and when, for each persona 316A and 316B. In some instances, communication manager 318 may provide such configuration and/or control in response to receiving user input (e.g., input from an administrator).

As one example, for each persona 316A and 316B, an administrator can decide which media (e.g., wireless (Wi-Fi), wired (Ethernet)) can be used with each respective persona. Each link can use its own encryption keys (and VPN tunnel(s)) depending on the active persona using encryption modules 352, recognizing that different VPN gateways serve personas in different security domains, and that even personas in the same security domain may not be allowed access to the same gateways, depending on the user role. Regardless of the active persona and the available links, communication manager 318 may ensure (e.g., using encryption modules 352) that the data is always encrypted using the correct keys without, in many cases, any user intervention or persona knowledge.

In certain examples, communication manager 318 may implement data prioritization and/or categorization using one or more data categorizers 354. Communication manager 318 may also implement various link functions, such as link failover, optimal link selection, and/or load balancing, using one or more link managers 350 and/or one or more network interface modules 356. Link managers 350 and/or network interface modules 356 may, in some examples, continuously monitor the quality of each link and assign different metrics to each link based on bandwidth, packet loss, and/or latency or other characteristics of the respective link and associated communication network. Various criteria, such as the ones described above, may be used by link managers 350 and/or network interface modules 356 to determine which link or communication network may be used at any point in time for data communication with a given persona. In some examples, link managers 350 and/or network interface modules 356 may make policy-based routing decisions to utilize the best media for the specific needs of various data types. For example, Voice-over-Internet Protocol (VoIP) may require a low latency media, and low bandwidth, whereas data downloads may require high bandwidth but not necessarily low latency. Link managers 350 and/or network interface modules 356 may also monitor for the detection of unreliable links. If the quality of a link degrades below a certain level (e.g., as signified by high packet loss or no connectivity at all), any communication going through that link may be diverted to another link if available. This transparent failover capability allows communication to be redirected to a new media without the knowledge of personas 316A or 316B. Because failover can be performed in a matter of seconds, applications in an active persona will not notice the temporary loss of connectivity as connections previously routed over failed media are rerouted.

Different techniques may be used to monitor link availability and/or quality (e.g., metrics associated with bandwidth, packet loss, and/or latency). At the basic connectivity level, link managers 350 and/or network interface modules 356 may send Internet Control Message Protocol (ping) or similar packets to the configured VPN gateways and accumulate statistics for each link over time. If the dropped ping packets exceed a threshold, the link is deemed to be down and the communication is switched over to another link. If the connection is restored over the link, the communication may be resumed over the link.

Another technique is monitoring the active communication sessions, allowing metrics (e.g., metrics associated with bandwidth, packet loss, and/or latency) to be derived from user traffic with no additional load and/or minimal impact. For instance, to collect session-based metrics, confederate network monitors or agents near the VPN client and gateway, or VPN clients and gateways augmented to identify flows and that work together as confederates or agents, in cooperation with link managers 350 and/or network interface modules 356, may measure latency, packet loss, and/or bandwidth using existing traffic. (Examples of such clients and gateways are illustrated in FIGS. 4A-4D.) Techniques can take advantage of user Transmission Control Protocol (TCP) flows, using TCP acknowledgements (ACKs), to time the packet delivery time over a media and derive bandwidth, packet loss, and/or latency based on many combined packet measurements, or it can involve small synthetic ACKs between confederates or agents, regardless of whether TCP flows can be distinguished or all flows are encrypted.

When existing traffic may not be sufficient to establish reliable metrics, confederates or agents may send/receive synthetic packets to/from the gateway. The state of each flow may be maintained to help establish better metrics over time. Link managers 350 and/or network interface modules 356 may keep an additional set of statistics based on latency, packet loss, and/or bandwidth to actual server addresses, before a second layer of encryption using encryption modules 352 to the gateways takes place, making end-to-end metric estimates possible. This may help link managers 350 and/or network interface modules 356 pick the optimal path not only based on the link metric to the next hop, but the quality of the route from the VPN gateway to the actual server. In such fashion, link managers 350 and/or network interface modules 356, in cooperation with confederate network monitors or agents that are located remotely from the mobile computing device, may measure metrics associated with such items as bandwidth, packet loss, and latency, with potentially minimal impact, of monitored data flows produced by user applications, such as personas 316A and 316B shown in FIG. 3, in order to characterize one or more available communication networks (e.g., one or more of networks 122 shown in FIG. 1; one or more of networks 222 shown in FIG. 2). The remote confederate network monitors or agents may, in some cases, be configured to passively monitor packets in a given flow, and link managers 350 and/or network interface modules 356, in cooperation with these confederate network monitors or agents, may measure the time-of-transit of variously sized packets to estimate bandwidth, packet loss, and/or latency.

If more than one link is available at the same time, link managers 350 and/or network interface modules 356 may route the packets based on certain other criteria, such as the type of communication and administratively configured priority, using, for example, data categorizers 354. As one example, a VoIP call may require low latency, and it may be routed through the link with the lowest latency metric. A big file download on the other hand, can be served by a high-bandwidth link, even if the link does not necessarily have low latency. If several flows are competing on the same link, and the link cannot potentially accommodate them all simultaneously, data categorizers 354 may, in some cases, apply a priority-based selection, where the flow with the higher priority is serviced first while the others are throttled, queued, or directed to an alternative link. In some cases, data categorizers 354 may assign priorities to flows based on the type of data being communicated (e.g., based on data type or category) and/or based on the persona (e.g., classified persona versus an unclassified persona) that is the source of the data.

FIGS. 4A-4D are block diagrams illustrating example flows of information from a communication manager 418 of a mobile computing device 412 to external classified and unclassified servers, in accordance with one or more aspects of the present disclosure. In the examples of FIGS. 4A-4D, mobile computing device 412 may be one example of mobile computing device 112 (FIG. 1) and/or computing device 212 (FIG. 2), and communication manager 418 may be one example of communication manager 118 (FIG. 1), communication manager 218 (FIG. 2), and/or communication manager 318 (FIG. 3). The non-limiting examples illustrated in FIGS. 4A-4D are shown for purposes of illustration only.

As shown in these figures, mobile computing device 412 may include a classified persona virtual machine guest OS environment 416A and an unclassified persona virtual machine guest OS environment 416B. (For purposes of brevity, the secure virtual machine host environment provided by mobile computing device 412 is not shown in these figures.) Classified persona virtual machine guest OS environment 416A may comprise a virtual machine and may be one example of application environment 116A (FIG. 1), first persona 216A (FIG. 2), and/or first persona 316A (FIG. 3). Unclassified persona virtual machine guest OS environment 416B may comprise a virtual machine and may be one example of application environment 116B (FIG. 1), first persona 216B (FIG. 2), and/or first persona 316B (FIG. 3).

Communication manager 418 may include one or more link managers 450, one or more data categorizers 454, one or more encryption modules 452, and network interface modules 456. Link managers 450 may be one example of link managers 350 (FIG. 3), data categorizers 454 may be one example of data categorizers 354 (FIG. 3), encryption modules 452 may be one example of encryption modules 352 (FIG. 3), and network interface modules 456 may be one example of network interface modules 356 (FIG. 3). In the non-limiting examples shown in FIGS. 4A-4D, network interface modules 456 include a classified Ethernet client 458, an unclassified Ethernet client 460, a classified wireless client 462, and an unclassified wireless client 464. Each of classified Ethernet client 458 and classified wireless client 462 may be assigned to or otherwise associated with classified persona 416A, while unclassified Ethernet client 460 and unclassified wireless client 464 may be assigned to or otherwise associated with unclassified persona 416B.

Classified Ethernet client 458 and unclassified Ethernet client 460 are examples of wired clients and are each configured to communicate via Ethernet network 422B. However, classified Ethernet client 458 is configured to communicate with classified Ethernet gateway 466 via Ethernet network 422B, while unclassified Ethernet client 460 is configured to communicate with unclassified Ethernet gateway 472 via Ethernet network 422B.

Classified wireless client 462 and unclassified wireless client 464 are each configured to communicate with wireless network 422A (e.g., Wi-Fi network). However, classified wireless client 462 is configured to communicate with classified wireless gateway 470 via wireless network 422A, while unclassified wireless client 464 is configured to communicate with unclassified wireless gateway 476 via wireless network 422A.

Classified Ethernet gateway 466 and classified wireless gateway 470 are configured to communicate with one or more classified web and file servers 468. Unclassified Ethernet gateway 472 and unclassified wireless gateway 476 are configured to communicate with one or more unclassified web and file servers 474.

In the examples of FIGS. 4A-4D, communication manager 418 is enabled to leverage two different media, namely wired (Ethernet) and wireless media, and to automatically react to changing media environments, as will be described in further detail below. Communication manager 418 may also monitor latency for the two media and automatically switch all traffic to the media with the lowest latency in various cases, ensuring the best link is used if both are available. Mobile computing device 412 is configured to host two personas in the non-limiting examples of FIGS. 4A-4D: one in the classified security domain (classified persona 416A), and one in the unclassified security domain (unclassified persona 416B). Classified web and file servers 468 are communicatively coupled to classified Ethernet gateway 466 and classified wireless gateway 470, which may be completely isolated from unclassified web and file servers 474, unclassified Ethernet gateway 472, and unclassified wireless gateway 476. Access to classified web and file servers 468 occurs via one or more secure VPN gateways, either using classified Ethernet gateway 466 or classified wireless gateway 470, using corresponding authentication and encryption keys, which may be stored and accessed by communication manager 418, and which, in various examples, may be inaccessible directly by personas 416A and 416B. Different keys may be associated with each VPN gateway, and any attempt to access a gateway by a system without the appropriate keys may be denied by the respective gateway, providing administrative control over entities having access to each security domain.

In the illustrated examples, classified Ethernet client 458 of network interface modules 456 (in communication manager 418) may control communications with classified Ethernet gateway 466 via Ethernet network 422B, and may manage a first group of authentication and encryption keys that are associated with classified Ethernet gateway 466. Unclassified Ethernet client 460 may control communications with unclassified Ethernet gateway 472 via Ethernet network 422B, and may manage a second group of authentication and encryption keys associated with unclassified Ethernet gateway 472. Classified wireless client 462 may control communications with classified wireless gateway 470 via wireless network 422A, and may manage a third group of authentication and encryption keys associated with classified wireless gateway 470. Unclassified wireless client 464 may control communications with unclassified wireless gateway 476 via wireless network 422A, and may manage a fourth group of authentication and encryption keys associated with unclassified wireless gateway 476.

Communication manager 418 may only allow communication between mobile computing device 412 and the authorized VPN gateways (e.g., one of classified Ethernet gateway 466, classified wireless gateway 470, unclassified Ethernet gateway 472, unclassified wireless gateway 476) to ensure mobile computing device 412 only accesses servers or other endpoints of a known classification level matching the active persona. Thus, if classified persona 416A is the currently active persona, communication manager 418 ensures that either classified Ethernet client 458 or classified wireless client 462 is used to securely communicate (e.g., via a respective VPN) with classified web and file servers 468 via either classified Ethernet gateway 466 or classified wireless gateway 470, respectively. On the other hand, if unclassified persona 416B is the active persona, communication manager 418 ensures that either unclassified Ethernet client 460 or unclassified wireless client 464 is used to securely communicate (e.g., via a respective VPN) with unclassified web and file servers 474 via either unclassified Ethernet gateway 472 or unclassified wireless gateway 476, respectively. In various examples, each of classified Ethernet gateway 466, classified wireless gateway 470, unclassified Ethernet gateway 472, and unclassified wireless gateway 476 may comprise a respective VPN gateway.

In various examples, classified persona 416A and classified web and file servers 468 appear to be on the same local network. Similarly, unclassified persona 416B and unclassified web and file servers 474 appear to be on a different local network. This highlights the fact that each persona 416A and 416B may not have information regarding how packets get to and from the respective servers 468 and 474. For example, from its perspective, classified persona 416A may be directly attached to the secure site infrastructure provided by classified web and file servers 468. Similarly, from its perspective, unclassified persona 416B may be directly attached to the secure site infrastructure provided by unclassified web and file servers 474.

Figure 4A:
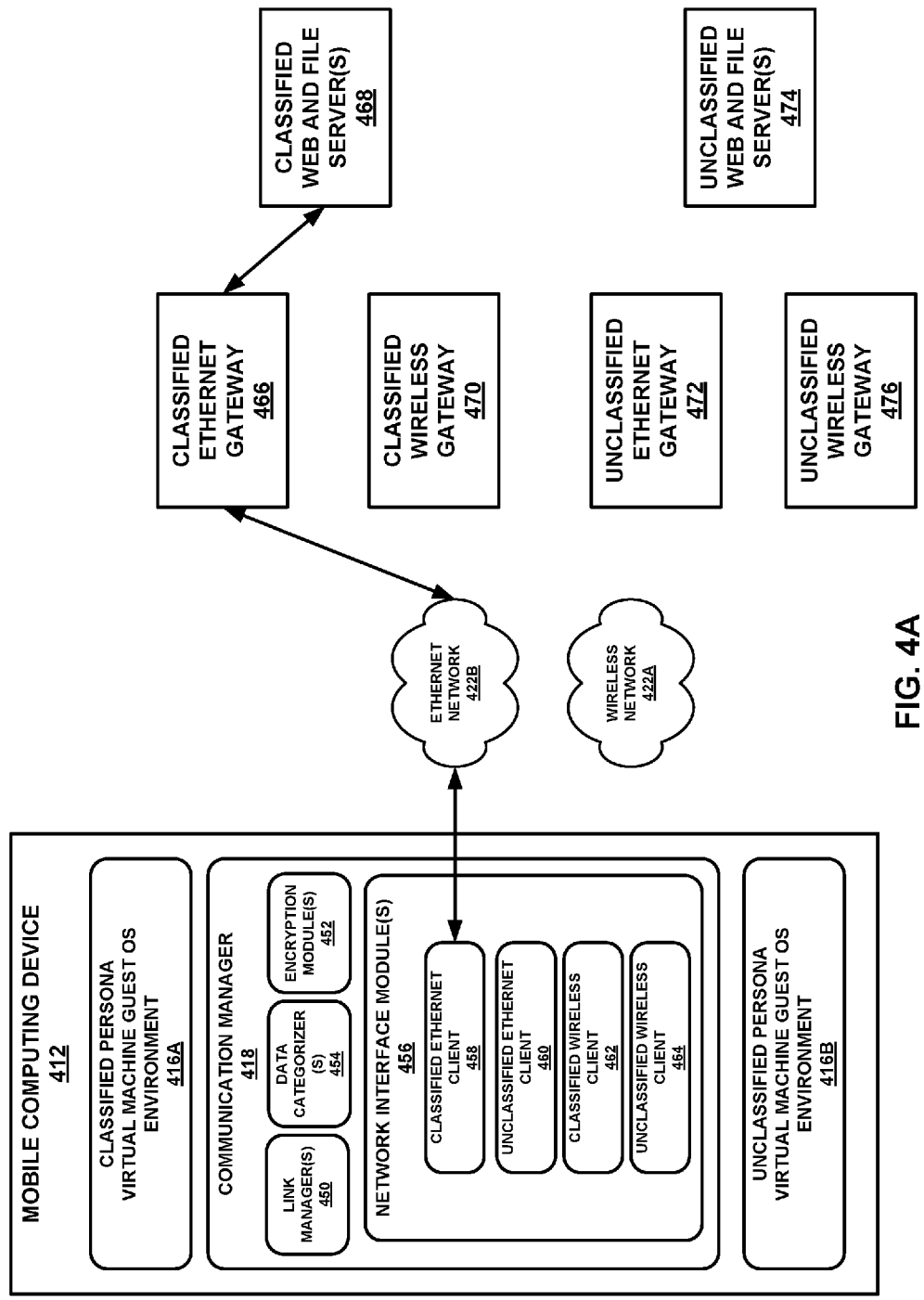
FIGS. 4A-4D are block diagrams illustrating example flows of information from a communication manager of a mobile computing device to external classified and unclassified servers, in accordance with one or more aspects of the present disclosure.

As particularly illustrated in FIG. 4A, it is assumed that classified persona 416A is the currently active persona, and it is also assumed that Ethernet network 422B is available. As a result, communication manager 418 selects classified Ethernet client 458 to communicate with classified web and file servers 468 via Ethernet network 422B and classified Ethernet gateway 466. Even if wireless network 422A is available, communication manager 418 may, in various cases, select classified Ethernet client 458 over classified wireless client 462 if communication manager 418 determines that Ethernet network 422B is preferred over wireless network 422A (e.g., based on speed, bandwidth, latency, reliability, data category/priority, and/or other criteria). Certain examples of data category or data type may include VoIP, file downloads, or email. Bandwidth and/or latency requirements may be dependent on the data category or priority, in many cases. Classified Ethernet client 458 may utilize one or more authentication and encryption keys to communicate with classified Ethernet gateway 466. A second layer of encryption and/or authentication may be provided by classified persona 416A and classified web and file servers 468, such that classified persona 416A and classified web and file servers 468 may utilize a separate group of authentication and/or encryption keys that is applied to exchanged data.

As noted earlier, communication manager 418 may also select one of network interface modules 456 based on one or more criteria, such as one or more of the criteria described above. As one non-limiting example, communication manager 418 may select one or network interface modules 456 based on the priority and/or categorization of data that is being sent from a persona, such as classified persona 416A. In addition, if a persona, such as persona 416A, includes various different applications, communication manager 418 may further base its decision on the specific application, or type of application, that is sending the data.

Continuing with the above example, at a given point in time, Ethernet network 422B may become unavailable, or communication manager 418 may determine that wireless network 422A has become a preferred network over Ethernet network 422B (e.g., based on one or more of the example criteria described above).

Figure 4B:
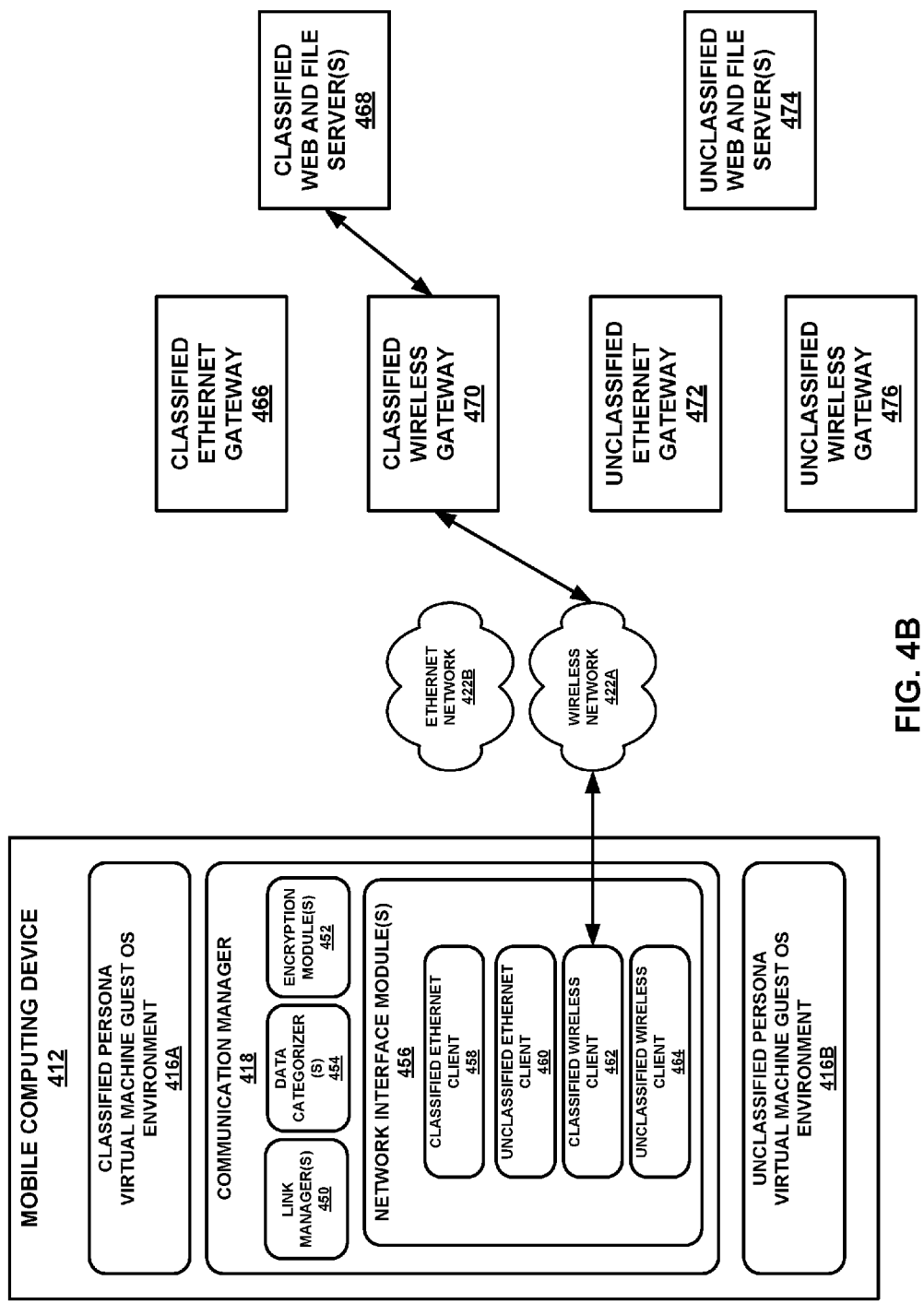

In this example, if another communication network such as wireless network 422A becomes available, communication manager 418 may select classified wireless client 462 to continue communication between classified persona 416A and classified web and file servers 468. Communication manager 418 and/or classified wireless client 462 may receive additional information that is associated with the security domain (e.g., classified domain) for classified persona 416A, which may be provided by classified persona 416A. Communication manager 418 and/or classified wireless client 462 may determine that this additional information is to be sent to classified web and file servers 468 via classified wireless gateway 470 (e.g., using a VPN). Communication manager 418 and/or classified wireless client 462 may encrypt the additional information, using mechanisms such as those described previously. As shown in FIG. 4B, classified wireless client 462 communicates with classified wireless gateway 470 via wireless network 422A, and classified wireless gateway 470 communicates with classified web and file servers 468. As a result, classified persona 416A is capable of maintaining seamless connectivity with classified web and file servers 468, even after Ethernet network 422B is unavailable, such that wireless network 422A is used instead.

Continuing again with this example, at a subsequent time, Ethernet network 422B may once again become available. At this stage, if communication manager 418 determines that Ethernet network 422B is preferred over wireless network 422A (e.g., based on speed, bandwidth, latency, reliability, data category/type/priority, and/or other criteria), communication manager 418 may again select classified Ethernet client 458 to resume data communication between classified persona 416A and classified web and file servers 468 via Ethernet network 422B and classified Ethernet gateway 466.

Figure 4C:
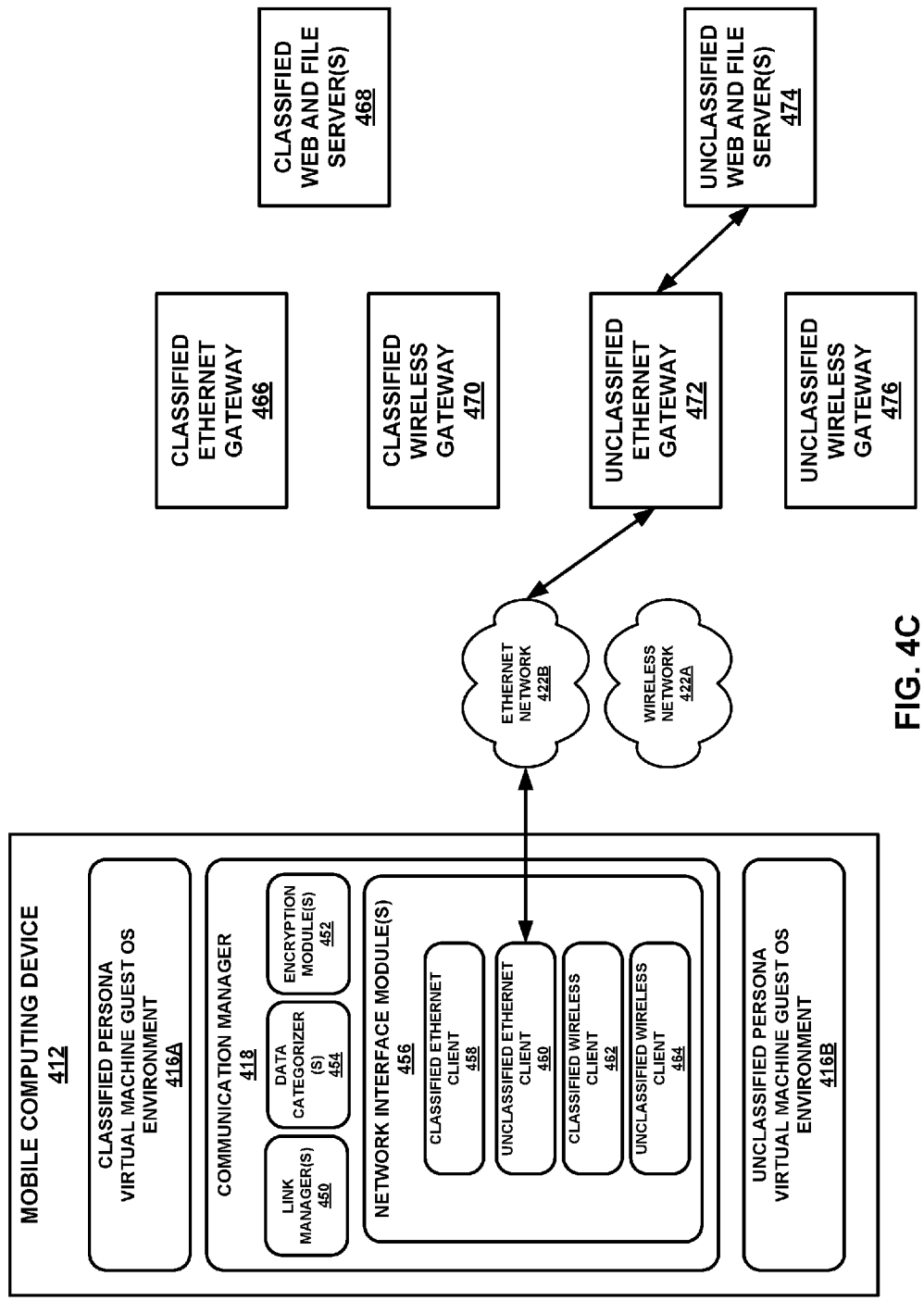
Figure 4D:
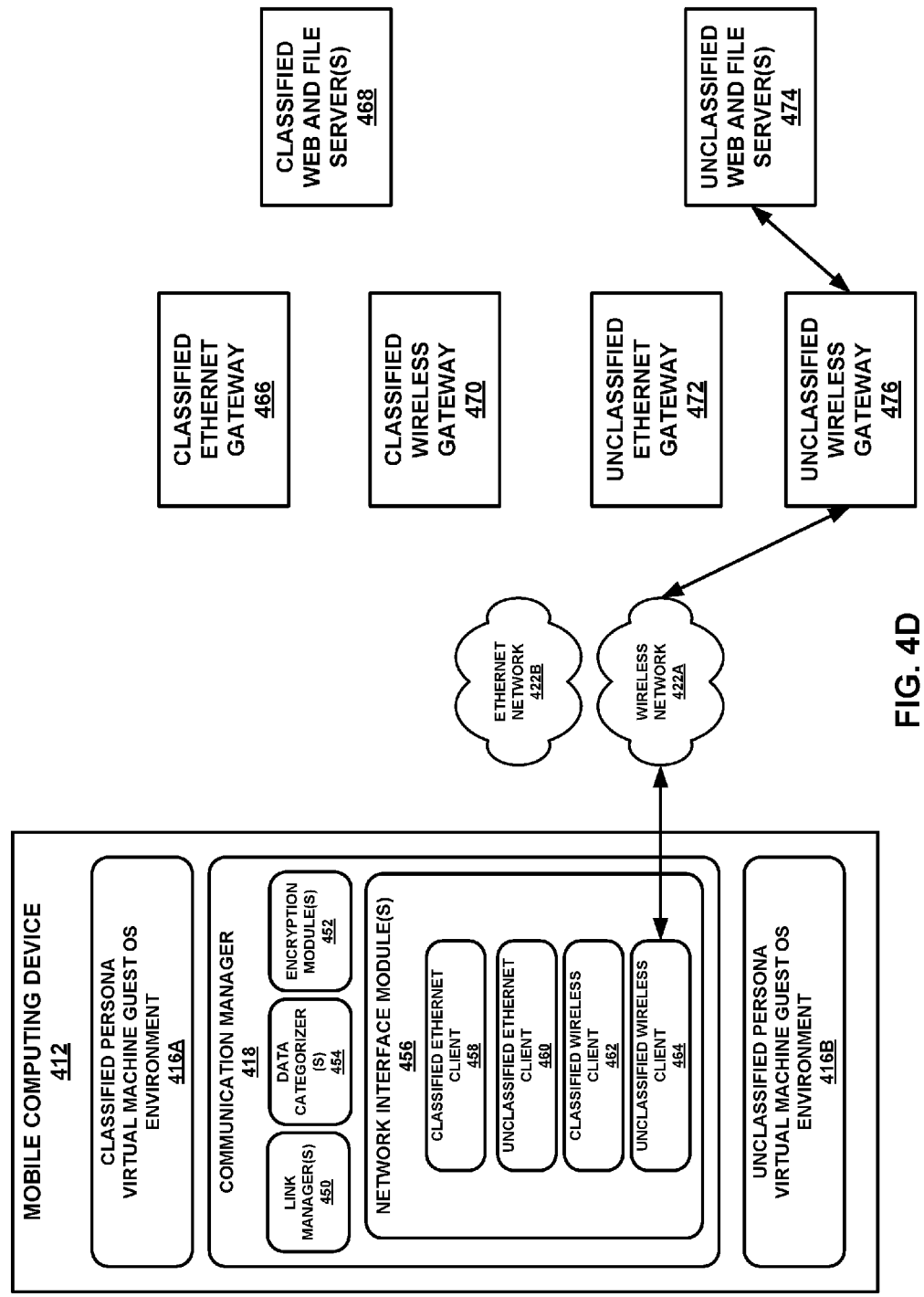

If classified persona 416A becomes disabled or suspended, and unclassified persona 416B becomes the active persona, communication manager 418 determines whether to use unclassified Ethernet client 460 or unclassified wireless client 464 to enable communication between unclassified persona 416B and unclassified web and file servers 474. If Ethernet network 422B is available, and communication manager 418 determines that Ethernet network 422B is preferred over wireless network 422A, communication manager 418 selects unclassified Ethernet client 460 to communicate with unclassified Ethernet gateway 472 and unclassified web and file servers 474 via Ethernet network 422B, as shown in FIG. 4C. If Ethernet network 422B, at some point in time, is no longer available, or if communication manager 418 determines that wireless network 422A has become a preferred network over Ethernet network 422B, communication manager 418 may select unclassified wireless client 464 to communicate with unclassified wireless gateway 476 and unclassified web and file servers 474, as shown in FIG. 4D, enabling unclassified persona 416B to continue interacting with unclassified web and file servers 474 in a seamless fashion.

Figure 5:
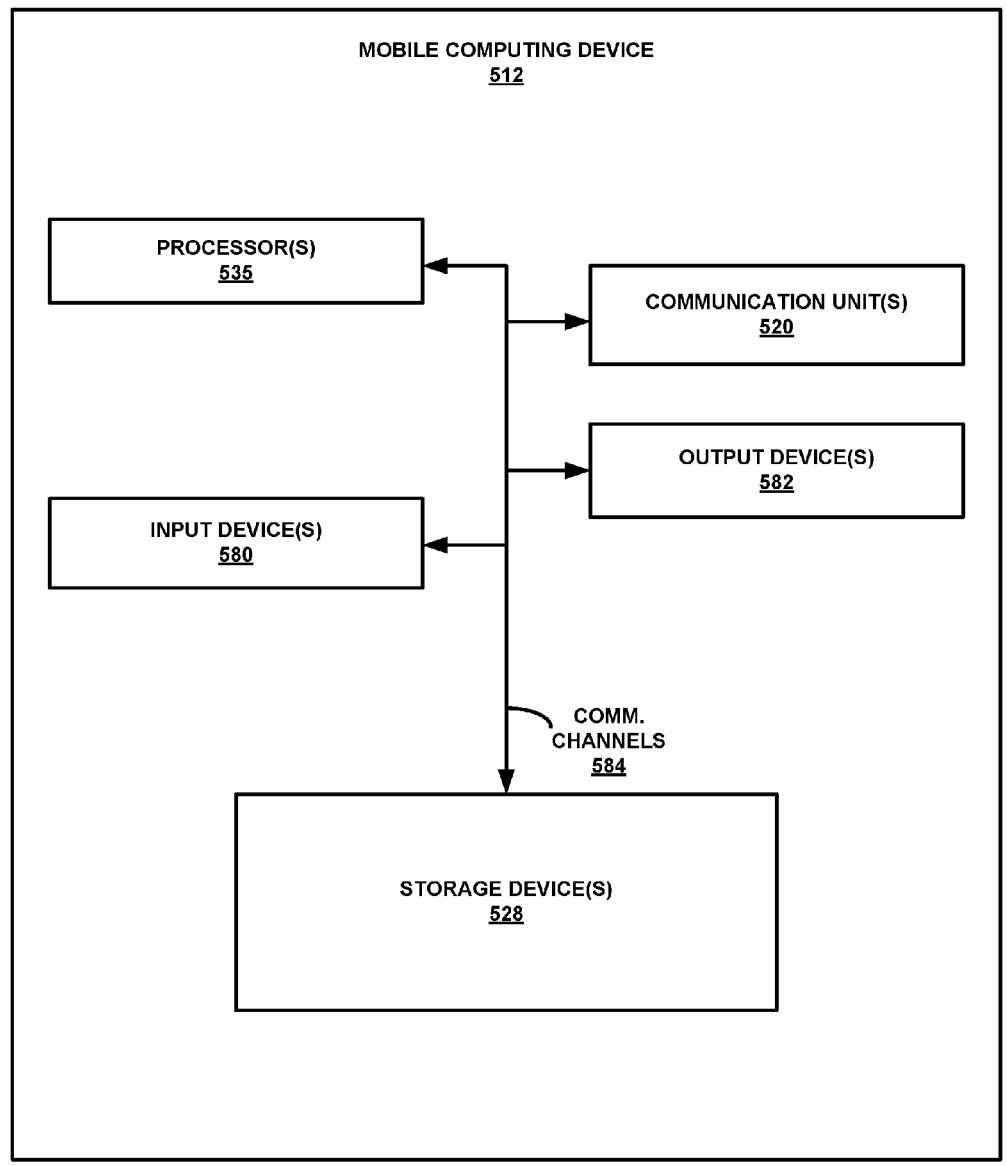
FIG. 5 is a block diagram illustrating further details of an example mobile computing device, in accordance with one or more aspects of the present disclosure.

FIG. 5 is a block diagram illustrating further details of an example computing device 512, in accordance with one or more aspects of the present disclosure. FIG. 5 illustrates only one particular example of computing device 512, and many other examples of computing device 512 may be used in other instances and may include a subset of the components shown, or may include additional components not shown, in FIG. 5. Mobile computing device 512 may be one example of mobile computing device 112 (FIG. 1), mobile computing device 212 (FIG. 2), and/or mobile computing device 412 (FIGS. 4A-4D).

As shown in the example of FIG. 5, mobile computing device 512 includes one or more processors 535, one or more input devices 580, one or more communication units 520, one or more output devices 582, and one or more storage devices 528. Communication channels 584 may interconnect each of the components 535, 520, 582, 580, and 528 for inter-component communications (physically, communicatively, and/or operatively). In some examples, communication channels 584 may include a system bus, a network connection, an inter-process communication data structure, or any other method for communicating data between hardware and/or software.

One or more input devices 580 of mobile computing device 512 may receive input. Examples of input are tactile, audio, and video input. Examples of input devices 580 include a presence-sensitive screen, touch-sensitive screen, mouse, keyboard, voice responsive system, video camera, microphone or any other type of device for detecting input from a human or machine. Touchscreen 224 (FIG. 2), cameras 226 (FIG. 2), audio devices 232 (FIG. 2), and/or buttons 234 (FIG. 2) may be examples of input devices 580.

One or more output devices 582 of mobile computing device 512 may generate output. Examples of output are tactile, audio, and video output. Examples of output devices 582 include a presence-sensitive screen, sound card, video graphics adapter card, speaker, cathode ray tube (CRT) monitor, liquid crystal display (LCD), or any other type of device for generating output to a human or machine. Output devices 582 may include display devices such as cathode ray tube (CRT) monitor, liquid crystal display (LCD), or any other type of device for generating tactile, audio, and/or visual output. Touchscreen 224 (FIG. 2) and/or audio devices 232 (FIG. 2) may be examples of output devices 582.

One or more communication units 520 may communicate with one or more other computing systems or devices via one or more networks by transmitting and/or receiving network signals on the one or more networks. Examples of communication units 520 include a network interface card (e.g. such as an Ethernet card), an optical transceiver, a radio frequency transceiver, or any other type of device that can send and/or receive information, such as through a wired or wireless network. Other examples of communication units 520 may include short wave radios, cellular data radios, wireless Ethernet network radios, as well as universal serial bus (USB) controllers. Communication units 520 may provide wired and/or wireless communication. Communication units 120 (FIG. 1) and/or communication units 220 (FIG. 2) may be examples of communication units 520.

One or more storage devices 528 may store information for processing during operation of mobile computing device 512 (e.g., mobile computing device 512 may store data accessed by one or more modules, processes, applications, or the like during execution at mobile computing device 512). Storage devices 228 (FIG. 2) are one example of storage devices 528. In some examples, storage devices 528 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 528, in some examples, also include one or more computer-readable storage media. Storage devices 528 may be configured to store larger amounts of information than volatile memory. Storage devices 528 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 528 may store program instructions and/or data associated with one or more software/firmware elements or modules.

For example, when mobile computing device 512 comprises an example of mobile computing device 112 shown in FIG. 1, storage devices 528 may store instructions and/or data associated with secure host environment 114, application environments 116, and communication manager 118. When mobile computing device 512 comprises an example of mobile computing device 212 shown in FIG. 2, storage devices 528 may store instructions and/or data associated with secure boot module 236, secure virtual machine host environment 214, personas 216, control domain 243, persona/resource manager 244, communication manager 218, and/or secure boot module 242. Storage devices 528 may also store instructions and/or data associated with personas 316, control domain 343, communication manager 318, link managers 350, encryption modules 352, data categorizers 354, and/or network interface modules 356 (FIG. 3). When mobile computing device 512 comprises an example of mobile computing device 412 shown in FIGS. 4A-4D, storage devices 528 may store instructions and/or data associated with personas 416, communication manager 418, link managers 450, data categorizers 454, encryption modules 452, and network interface modules 456.

Mobile computing device 512 further includes one or more processors 535 that may implement functionality and/or execute instructions within mobile computing device 512. For example, processors 535 may receive and execute instructions stored by storage devices 528 that execute the functionality of the elements and/or modules described herein. These instructions executed by processors 535 may cause mobile computing device 512 to store information within storage devices 528 during program execution. Processors 535 may also execute instructions of the operating system to perform one or more operations described herein. Processors 235 (FIG. 2) may be one example of processors 535.

Figure 6:
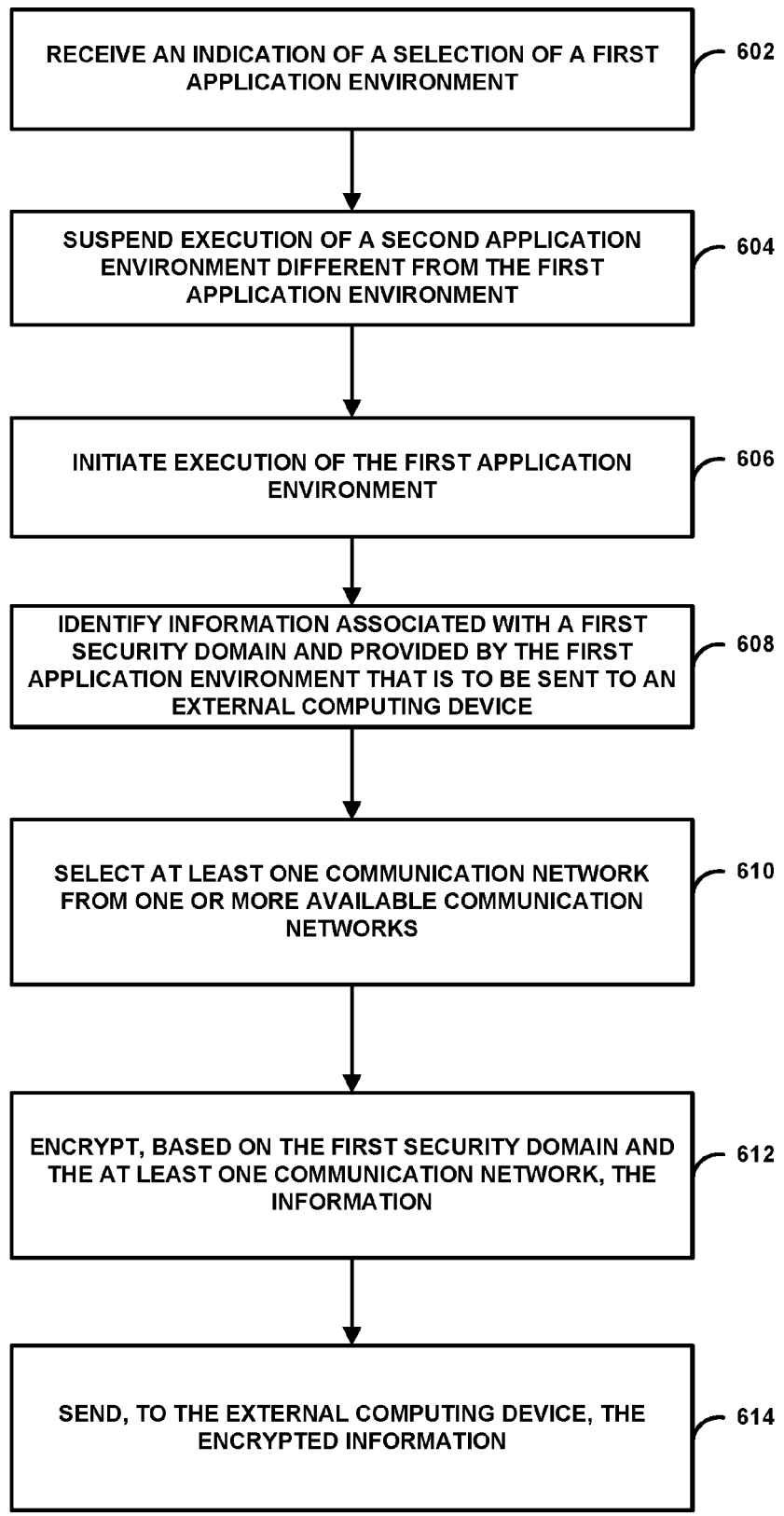
FIG. 6 is a flow diagram illustrating an example process that may be performed by a computing device, such as the mobile computing device shown in FIG. 1, FIG. 2, FIGS. 4A-4D, and/or FIG. 5, and/or a mobile computing device that includes the communication manager shown in FIG. 3, in accordance with one or more aspects of the present disclosure.

FIG. 6 is a flow diagram illustrating an example process that may be performed by a mobile computing device, in accordance with one or more aspects of the present disclosure. For example, the process illustrated in FIG. 6, which may comprise one or more operations, may be performed by one or more of the mobile computing devices shown in FIGS. 1, 2, 4A-4D, and/or 5, and/or a mobile computing device that includes the communication manager shown in FIG. 3. For purposes of illustration only, it will be assumed that the process of FIG. 6 is performed by mobile computing device 112 shown in FIG. 1.

As illustrated in the example process of FIG. 6, mobile computing device 112 receives (602) an indication of a selection of a first application environment (e.g., application environment 116A) from a plurality of application environments, where the first application environment comprises a first virtual environment (e.g., virtual machine, container) that is associated with a first security domain (e.g., classified domain), and where the first application environment is not currently executing on mobile computing device 112. Responsive to receiving the indication of the selection of the first application environment, mobile computing device 112 suspends (604) execution of a second application environment (e.g., application environment 116N) from the plurality of application environments, where the second application environment is different from the first application environment, and where the second application environment comprises a second virtual environment (e.g., virtual machine, container) that is associated with a second security domain (e.g., unclassified security domain) different from the first security domain.

After suspending execution of the second application environment, mobile computing device 112 initiates (606) execution of the first application environment on mobile computing device 112, where the first application environment is configured to isolate execution of one or more software applications within the first application environment, and mobile computing device 112 identifies (608) information associated with the first security domain and provided by the first application environment that is to be sent to an external computing device associated with the first security domain. Mobile computing device 112 selects (610) at least one communication network from one or more communication networks (e.g., networks 122) that are each available to mobile computing device 112 for data communication, wherein selecting the at least one communication network is based on one or more criteria associated with at least one of the information associated with the first security domain or the one or more communication networks. Mobile computing device 112 encrypts (612), based on the first security domain and the at least one selected communication network, the information to generate encrypted information associated with the first security domain, and sends (614), to the external computing device, via the at least one selected communication network, the encrypted information. In certain cases, mobile computing device 112 may encrypt the information to generate the encrypted information associated with the first security domain further based on the at least one communication network.

In some examples, the first security domain may be a classified security domain, and the first application environment may be a persona (e.g., application environment 116A, persona 216A) associated with the classified security domain. The second security domain may be an unclassified security domain, and the second application environment may be a persona (e.g., application environment 116B, persona 216B shown in FIG. 2) associated with the unclassified security domain.

In some examples, the first virtual environment comprises a first virtual machine environment, and the second virtual environment comprises a second virtual machine environment. In some examples, the one or more criteria may be associated with at least one of latency characteristics, bandwidth characteristics, or packet loss characteristics associated with the at least one selected communication network. Mobile computing device 112 may, in some cases, in cooperation with one or more agents located remotely from mobile computing device 112, measure the at least one of the latency characteristics, the bandwidth characteristics, or the packet loss characteristics of one or more monitored data flows that are produced by the first application environment, in order to characterize the one or more communication networks. The one or more criteria may, in certain cases, be associated with at least one of a data category or a priority associated with the information associated with the first security domain that is to be sent to the external computing device.

In some examples, the one or more communication networks may comprise one or more wired networks (e.g., one or more of wired networks 222B shown in FIG. 2) and one or more wireless networks (e.g., one or more of wireless networks 222A). Selecting the at least one communication network may include selecting the at least one communication network based on one or more load balancing criteria associated with the one or more communication networks.

In some examples, mobile computing device 112 may select an external gateway (e.g., one of gateways 466, 470, 472, or 476 shown in FIGS. 4A-4D) that is communicatively coupled to the external computing device, and create a virtual private network across the at least one selected communication network that includes mobile computing device 112 and the external gateway. The virtual private network is associated with the first security domain, and mobile computing device 112 may send the encrypted information to the external gateway using the virtual private network.

In some examples, the at least one selected communication network comprises a first communication network, and the one or more communication networks comprise a plurality of communication networks. After sending the encrypted information, mobile computing device 112 may determine that the first communication network is no longer available to mobile computing device 112 for data communication. Mobile computing device 112 may select a second communication network that is available to mobile computing device 112 for data communication, the second communication network being different than the first communication network. Mobile computing device 112 may identify additional information associated with the first security domain and provided by the first application environment that is to be sent to the external computing device, and may encrypt, based on the first security domain, the additional information to generate encrypted additional information associated with the first security domain. Mobile computing device 112 may send, to the external computing device, via the second communication network, the encrypted additional information.

In some examples, after suspending execution of the second application environment, mobile computing device 112 may store state information associated with one or more resources of mobile computing device 112, which were previously used by the second application environment. Mobile computing device 112 may prohibit any communication with the second application environment. Mobile computing device 112 may prohibit the first application environment from modifying a virtual disk image associated with the second application environment.

In some examples, mobile computing device 112 may provide a virtual disk image associated with the first application environment, where the virtual disk image comprises a physical partition of a storage device or a file image, and where the virtual disk image includes state information associated with the first application environment. In some cases, mobile computing device 112 may provide a virtual disk image, where the virtual disk image comprises multiple physical partitions of one or more storage devices or multiple file images. Mobile computing device 112 may protect at least a portion of the virtual disk image from modification by the first application environment.

In some examples, mobile computing device 112 may provide a virtual disk image that is associated with the first application environment and with the second application environment. Mobile computing device 112 may assign, to the first application environment, first access rights to the virtual disk image, and may assign, to the second application environment, second access rights to the virtual disk image. One of the first access rights or the second access rights may comprise read-only access rights, and the other one of the first access rights or the second access rights may comprise at least write access rights (e.g., read-write), such that mobile computing device 112 may effectively enable one-way communication of information via the virtual disk image between the first application environment and with the second application environment.

In some examples, mobile computing device 112 may limit access of the first application environment to one or more resources of mobile computing device 112 by providing at least one virtualized communication channel between the first application environment and a communication manager (e.g., communication manager 118) executing on the mobile computing device. The communication manager controls the at least one virtualized communication channel, and the communication manger operates in a separate execution domain with respect to the first application environment. The communication manager may select the at least one communication network from one or more available physical communication networks, and select one or more gateways (e.g., one or more of gateways 466, 470, 472, 472 illustrated in FIGS. 4A-4D) per selected communication network for use in one or more virtual private networks.

In some examples, the communication manager may execute on mobile computing device 112 in a virtual environment that is isolated from the first application environment and from the second application environment. The communication manager may be configured to be modified only via encrypted communication with an administrative device that is located remotely from mobile computing device 112.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise random access memory (RAM), read-only memory (ROM), electrically erasable programmable read-only memory (EEPROM), compact disc read-only memory (CD-ROM) or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   executing, by a mobile computing device, a communication manager;
   receiving, by the mobile computing device comprising one or more processors, an indication of a selection of a first application environment from a plurality of application environments, wherein the first application environment comprises a first virtual environment that is associated with a first security domain, and wherein the first application environment is not currently executing on the mobile computing device;
   responsive to receiving the indication of the selection of the first application environment, suspending, by the mobile computing device, execution of a second application environment from the plurality of application environments, wherein the second application environment is different from the first application environment, wherein the second application environment comprises a second virtual environment that is associated with a second security domain different from the first security domain, and wherein the communication manager executes in a third virtual environment that operates in a separate execution domain with respect to each of the first application environment and the second application environment, such that the third virtual environment is isolated from each of the first application environment and the second application environment;

after suspending execution of the second application environment, initiating, by the mobile computing device, execution of the first application environment on the mobile computing device, wherein the first application environment is configured to isolate execution of one or more software applications within the first application environment;

determining, by the mobile computing device, one or more resources of the mobile computing device that are allocated to the first application environment during execution, wherein the one or more resources comprise at least one of processor usage, memory, or persistent storage of the mobile computing device;

after initiating execution of the first application environment, limiting, by the mobile computing device, access of the first application environment to the one or more resources of the mobile computing device, wherein the communication manager controls at least one virtualized communication channel with the first application environment to limit the access of the first application environment to the one or more resources;

identifying, by the mobile computing device, information associated with the first security domain and provided by the first application environment that is to be sent to an external computing device associated with the first security domain;

selecting, by the mobile computing device, at least one communication network from one or more communication networks that are each available to the mobile computing device for data communication, wherein selecting the at least one communication network is based on one or more criteria associated with at least one of the information associated with the first security domain or the one or more communication networks;

encrypting, by the mobile computing device, based on the first security domain and the at least one selected communication network, the information to generate encrypted information associated with the first security domain; and sending, by the mobile computing device and to the external computing device, via the at least one selected communication network, the encrypted information.

2. The method of claim 1,
wherein the first security domain comprises a classified security domain,
wherein the first application environment comprises a persona associated with the classified security domain,
wherein the second security domain comprises an unclassified security domain, and
wherein the second application environment comprises a persona associated with the unclassified security domain.

3. The method of claim 1, wherein the first virtual environment comprises a first virtual machine environment, and wherein the second virtual environment comprises a second virtual machine environment.

4. The method of claim 1, wherein the one or more criteria are associated with at least one of latency characteristics, bandwidth characteristics, or packet loss characteristics associated with the at least one selected communication network.

5. The method of claim 4, further comprising:
measuring, by the mobile computing device in cooperation with one or more agents located remotely from the mobile computing device, the at least one of the latency characteristics, the bandwidth characteristics, or the packet loss characteristics of one or more monitored data flows that are produced by the first application environment, in order to characterize the one or more communication networks.

6. The method of claim 1, wherein the one or more criteria are associated with at least one of a data category or a priority associated with the information associated with the first security domain that is to be sent to the external computing device.

7. The method of claim 1,
wherein the one or more communication networks comprise one or more wired networks and one or more wireless networks, and
wherein the one or more criteria comprise one or more load balancing criteria associated with the one or more communication networks.

8. The method of claim 1, further comprising:
selecting, by the mobile computing device, an external gateway that is communicatively coupled to the external computing device;
creating, by the mobile computing device, a virtual private network across the at least one selected communication network that includes the mobile computing device and the external gateway, wherein the virtual private network is associated with the first security domain,
wherein sending the encrypted information comprises sending the encrypted information to the external gateway using the virtual private network.

9. The method of claim 1, wherein the at least one selected communication network comprises a first communication network, wherein the one or more communication networks comprise a plurality of communication networks, and wherein the method further comprises:
after sending the encrypted information, determining, by the mobile computing device, that the first communication network is no longer available to the mobile computing device for data communication;
selecting, by the mobile computing device, a second communication network that is available to the mobile computing device for data communication, the second communication network being different than the first communication network;
identifying, by the mobile computing device, additional information associated with the first security domain and provided by the first application environment that is to be sent to the external computing device;
encrypting, by the mobile computing device, based on the first security domain, the additional information to generate encrypted additional information associated with the first security domain; and
sending, by the mobile computing device and to the external computing device, via the second communication network, the encrypted additional information.

10. The method of claim 1, further comprising:
after suspending execution of the second application environment:
storing, by the mobile computing device, state information associated with at least one resource of the mobile computing device previously used by the second application environment; and prohibiting, by the mobile computing device, any communication with the second application environment.

11. The method of claim 10, further comprising:
prohibiting, by the mobile computing device, the first application environment from modifying a virtual disk image associated with the second application environment.

12. The method of claim 1, further comprising:
providing, by the mobile computing device, a virtual disk image associated with the first application environment, wherein the virtual disk image comprises a physical partition of a storage device or a file image, and wherein the virtual disk image includes state information associated with the first application environment.

13. The method of claim 1, further comprising:
providing, by the mobile computing device, a virtual disk image, wherein the virtual disk image comprises multiple physical partitions of one or more storage devices or multiple file images; and
protecting, by the mobile computing device, at least a portion of the virtual disk image from modification by the first application environment.

14. The method of claim 1, further comprising:
providing, by the mobile computing device, a virtual disk image that is associated with the first application environment and with the second application environment;
assigning, by the mobile computing device and to the first application environment, first access rights to the virtual disk image; and
assigning, by the mobile computing device and to the second application environment, second access rights to the virtual disk image,
wherein one of the first access rights or the second access rights comprises read-only access rights, and wherein the other one of the first access rights or the second access rights comprises at least write access rights, such that the mobile computing device enables one-way communication of information via the virtual disk image between the first application environment and with the second application environment.

15. The method of claim 1, wherein selecting the at least one communication network from the one or more communication networks comprises selecting, by the communication manager, the at least one communication network from one or more available physical communication networks, and selecting one or more gateways per selected communication network for use in one or more virtual private networks.

16. The method of claim 1, wherein the communication manager is modified only via encrypted communication with an administrative device that is located remotely from the mobile computing device.

17. A mobile computing device, comprising:
one or more processors; and
a computer-readable storage device communicatively coupled to the one or more processors, wherein the computer-readable storage device stores instructions that, when executed by the one or more processors, cause the one or more processors to:
execute a communication manager;
receive, an indication of a selection of a first application environment from a plurality of application environments, wherein the first application environment comprises a first virtual environment that is associated with a first security domain, and wherein the first application environment is not currently executing on the mobile computing device;
responsive to receiving the indication of the selection of the first application environment, suspend execution of a second application environment from the plurality of application environments, wherein the second application environment is different from the first application environment, wherein the second application environment comprises a second virtual environment that is associated with a second security domain different from the first security domain, and wherein the communication manager executes in a third virtual environment that operates in a separate execution domain with respect to each of the first application environment and the second application environment, such that the third virtual environment is isolated from each of the first application environment and the second application environment;
after suspending execution of the second application environment, initiate execution of the first application environment on the mobile computing device, wherein the first application environment is configured to isolate execution of one or more software applications within the first application environment;
determine one or more resources of the mobile computing device that are allocated to the first application environment during execution, wherein the one or more resources comprise at least one of processor usage, memory, or persistent storage of the mobile computing device;
after initiating execution of the first application environment, limit access of the first application environment to the one or more resources of the mobile computing device, wherein the communication manager controls at least one virtualized communication channel with the first application environment to limit the access of the first application environment to the one or more resources;
identify information associated with the first security domain and provided by the first application environment that is to be sent to an external computing device associated with the first security domain;
select at least one communication network from one or more communication networks that are each available to the mobile computing device for data communication, wherein selecting the at least one communication network is based on one or more criteria associated with at least one of the information associated with the first security domain or the one or more communication networks;
encrypt, based on the first security domain and the at least one selected communication network, the information to generate encrypted information associated with the first security domain; and
send, to the external computing device, via the at least one selected communication network, the encrypted information.

18. The mobile computing device of claim 17, wherein the first virtual environment comprises a first virtual machine environment, and wherein the second virtual environment comprises a second virtual machine environment.

19. The mobile computing device of claim 17, wherein the one or more criteria are associated with at least one of latency characteristics, bandwidth characteristics, or packet loss characteristics associated with the at least one selected communication network.

20. The mobile computing device of claim 17, wherein the one or more criteria are associated with at least one of a data category or a priority associated with the information associated with the first security domain that is to be sent to the external computing device.

21. The mobile computing device of claim 17,
wherein the one or more communication networks comprise one or more wired networks and one or more wireless networks, and
wherein the one or more criteria comprise one or more load balancing criteria associated with the one or more communication networks.

22. The mobile computing device of claim 17, wherein the instructions stored by the computer-readable storage device further cause the one or more processors to:
select an external gateway that is communicatively coupled to the external computing device;
create a virtual private network across the at least one selected communication network that includes the mobile computing device and the external gateway, wherein the virtual private network is associated with the first security domain,
wherein the instructions stored by the computer-readable storage device that cause the one or more processors to send the encrypted information comprise instructions that cause the one or more processors to send the encrypted information to the external gateway using the virtual private network.

23. The mobile computing device of claim 17, wherein the at least one selected communication network comprises a first communication network, wherein the one or more communication networks comprise a plurality of communication networks, and wherein the instructions stored by the computer-readable storage device further cause the one or more processors to:
after sending the encrypted information, determine that the first communication network is no longer available to the mobile computing device for data communication;
select a second communication network that is available to the mobile computing device for data communication, the second communication network being different than the first communication network;
identify additional information associated with the first security domain and provided by the first application environment that is to be sent to the external computing device;
encrypt, based on the first security domain, the additional information to generate encrypted additional information associated with the first security domain; and
send, to the external computing device, via the second communication network, the encrypted additional information.

24. The mobile computing device of claim 17, wherein the instructions stored by the computer-readable storage device further cause the one or more processors to:
after suspending execution of the second application environment:
store state information associated with at least one resource of the mobile computing device previously used by the second application environment; and
prohibit any communication with the second application environment.

25. The mobile computing device of claim 17, wherein the instructions stored by the computer-readable storage device further cause the one or more processors to:
provide a virtual disk image associated with the first application environment, wherein the virtual disk image comprises a physical partition of a storage device or a file image, and wherein the virtual disk image includes state information associated with the first application environment.

26. The mobile computing device of claim 17, where the instructions stored by the computer-readable storage device further cause the one or more processors to:
provide a virtual disk image, wherein the virtual disk image comprises multiple physical partitions of one or more storage devices or multiple file images; and
protect at least a portion of the virtual disk image from modification by the first application environment.

27. The mobile computing device of claim 17, wherein the instructions stored by the computer-readable storage device that cause the one or more processors to select the at least one communication network from the one or more communication networks comprise instructions that cause the one or more processors to select, by the communication manager, the at least one communication network from one or more available physical communication networks, and selecting one or more gateways per selected communication network for use in one or more virtual private networks.

28. A computer-readable storage device storing instructions that, when executed, cause a mobile computing device comprising one or more processors to perform operations comprising:
executing a communication manager;
receiving an indication of a selection of a first application environment from a plurality of application environments, wherein the first application environment comprises a first virtual environment that is associated with a first security domain, and wherein the first application environment is not currently executing on the mobile computing device;
responsive to receiving the indication of the selection of the first application environment, suspending execution of a second application environment from the plurality of application environments, wherein the second application environment is different from the first application environment, wherein the second application environment comprises a second virtual environment that is associated with a second security domain different from the first security domain, and wherein the communication manager executes in a third virtual environment that operates in a separate execution domain with respect to each of the first application environment and the second application environment, such that the third virtual environment is isolated from each of the first application environment and the second application environment;
after suspending execution of the second application environment, initiating execution of the first application environment on the mobile computing device, wherein the first application environment is configured to isolate execution of one or more software applications within the first application environment;
determining one or more resources of the mobile computing device that are allocated to the first application environment during execution, wherein the one or more resources comprise at least one of processor usage, memory, or persistent storage of the mobile computing device;

after initiating execution of the first application environment, limiting access of the first application environment to the one or more resources of the mobile computing device, wherein the communication manager controls at least one virtualized communication channel with the first application environment to limit the access of the first application environment to the one or more resources;

identifying information associated with the first security domain and provided by the first application environment that is to be sent to an external computing device associated with the first security domain;

select at least one communication network from one or more communication networks that are each available to the mobile computing device for data communication, wherein selecting the at least one communication network is based on one or more criteria associated with at least one of the information associated with the first security domain or the one or more communication networks;

encrypting, based on the first security domain and the at least one selected communication network, the information to generate encrypted information associated with the first security domain; and sending, to the external computing device, via the at least one selected communication network, the encrypted information.

* * * * *